(12) United States Patent
Kennon et al.

(10) Patent No.: US 7,369,973 B2
(45) Date of Patent: May 6, 2008

(54) METHOD AND SYSTEM FOR REPRESENTING RESERVOIR SYSTEMS

(75) Inventors: Stephen R. Kennon, Austin, TX (US); Steven B. Ward, Austin, TX (US)

(73) Assignee: Object Reservoir, Inc., Austin, TX (US)

( * ) Notice: Subject to any disclaimer, the term of this patent is extended or adjusted under 35 U.S.C. 154(b) by 327 days.

(21) Appl. No.: 11/187,600

(22) Filed: Jul. 22, 2005

(65) Prior Publication Data
US 2006/0025976 A1     Feb. 2, 2006

Related U.S. Application Data

(63) Continuation-in-part of application No. 09/896,137, filed on Jun. 29, 2001, now Pat. No. 7,027,964, application No. 11/187,600, which is a continuation-in-part of application No. 09/896,136, filed on Jun. 29, 2001, now Pat. No. 7,260,508, application No. 11/187,600, which is a continuation-in-part of application No. 09/896,147, filed on Jun. 29, 2001, now Pat. No. 7,043,413, application No. 11/187,600, which is a continuation-in-part of application No. 09/896,132, filed on Jun. 29, 2001, now Pat. No. 6,941,255.

(60) Provisional application No. 60/215,697, filed on Jun. 29, 2000.

(51) Int. Cl.
*G06F 17/10* (2006.01)

(52) U.S. Cl. .............................. 703/2; 703/10; 367/72; 702/12; 702/13

(58) Field of Classification Search .................... 703/2, 703/10; 367/72; 702/12, 13; 382/128
See application file for complete search history.

(56) References Cited

U.S. PATENT DOCUMENTS

| 3,029,710 A | 4/1962 | Floyd, Jr. |
| 3,302,710 A | 2/1967 | Odeh |
| 4,742,473 A | 5/1988 | Shugar et al. |

(Continued)

FOREIGN PATENT DOCUMENTS

EP     0 709 789     5/1996

(Continued)

OTHER PUBLICATIONS

M.F. Wheeler et al., "A Parallel Multiblock/Multidomain Approach for Reservoir Simulation," U of Texas, SPE 51884, 1999; pp. 51-61.

(Continued)

*Primary Examiner*—Paul Rodriguez
*Assistant Examiner*—K Thangavelu
(74) *Attorney, Agent, or Firm*—Toler Law Group

(57) ABSTRACT

The disclosure is directed to a computer-implemented method of representing fluid flow in a physical fluid reservoir. The method includes generating a mesh representation of the physical fluid reservoir having a plurality of mesh elements. Each of the plurality of mesh elements is representative of a regional portion of the fluid reservoir. The method further includes generating a matrix-based representation of fluid flow comprising matrix elements associated with a mesh element and selectively weighting the matrix elements based on fluid flow direction in the regional portion of the fluid reservoir represented by the mesh element associated with the matrix element.

20 Claims, 22 Drawing Sheets

U.S. PATENT DOCUMENTS

| | | | |
|---|---|---|---|
| 4,821,164 A | | 4/1989 | Swanson |
| 5,255,212 A | | 10/1993 | Kondoh et al. |
| 5,432,718 A | | 7/1995 | Molvig et al. |
| 5,572,634 A | | 11/1996 | Duluk, Jr. |
| 5,604,911 A | | 2/1997 | Ushiro |
| 5,617,322 A | | 4/1997 | Yokota |
| 5,675,521 A | | 10/1997 | Holzhauer et al. |
| 5,699,271 A | | 12/1997 | Sagawa et al. |
| 5,710,726 A | | 1/1998 | Rowney et al. |
| 5,740,342 A | | 4/1998 | Kocberber |
| 5,754,181 A | | 5/1998 | Amdursky et al. |
| 5,891,131 A | | 4/1999 | Rajan et al. |
| 5,966,524 A | | 10/1999 | Burnett et al. |
| 6,014,473 A | | 1/2000 | Hossack et al. |
| 6,018,497 A | * | 1/2000 | Gunasekera ............... 367/72 |
| 6,028,607 A | | 2/2000 | Chan |
| 6,041,017 A | | 3/2000 | Goldsberry |
| 6,052,520 A | | 4/2000 | Watts, III |
| 6,054,992 A | | 4/2000 | Gibson |
| 6,064,810 A | | 5/2000 | Raad et al. |
| 6,070,125 A | | 5/2000 | Murphy et al. |
| 6,078,869 A | | 6/2000 | Gunasekera |
| 6,094,619 A | * | 7/2000 | Noetinger et al. ............ 702/12 |
| 6,106,561 A | * | 8/2000 | Farmer ....................... 703/10 |
| 6,191,796 B1 | | 2/2001 | Tarr |
| 6,230,101 B1 | | 5/2001 | Wallis |
| 6,313,837 B1 | | 11/2001 | Assa et al. |
| 6,366,279 B1 | | 4/2002 | Gorman |
| 6,370,491 B1 | * | 4/2002 | Malthe-Sorenssen et al. .. 703/2 |
| 6,445,390 B1 | | 9/2002 | Aftosmis et al. |
| 6,448,788 B1 | | 9/2002 | Meaney et al. |
| 6,516,080 B1 | | 2/2003 | Nur |
| 6,552,724 B1 | | 4/2003 | Marshall |
| 6,587,104 B1 | | 7/2003 | Hoppe |
| 6,608,628 B1 | | 8/2003 | Ross et al. |
| 6,633,837 B1 | | 10/2003 | Dye et al. |
| 6,674,432 B2 | | 1/2004 | Kennon et al. |
| 6,810,370 B1 | * | 10/2004 | Watts, III .................... 703/10 |
| 6,816,820 B1 | | 11/2004 | Friedl et al. |
| 6,826,483 B1 | * | 11/2004 | Anderson et al. ............. 702/13 |
| 6,826,520 B1 | * | 11/2004 | Khan et al. ................... 703/10 |
| 6,842,725 B1 | * | 1/2005 | Sarda .......................... 703/10 |
| 6,876,959 B1 | * | 4/2005 | Peirce et al. .................. 703/10 |
| 6,928,399 B1 | * | 8/2005 | Watts et al. ................... 703/2 |
| 7,006,959 B1 | * | 2/2006 | Huh et al. .................... 703/10 |
| 2001/0056339 A1 | * | 12/2001 | Robinson et al. ............. 703/10 |
| 2002/0032494 A1 | | 3/2002 | Kennon et al. |
| 2002/0032550 A1 | | 3/2002 | Ward et al. |
| 2002/0035453 A1 | | 3/2002 | Pond, Jr. et al. |
| 2002/0046014 A1 | | 4/2002 | Kennon |
| 2002/0067373 A1 | | 6/2002 | Roe et al. |
| 2002/0072883 A1 | | 6/2002 | Lim et al. |
| 2002/0082813 A1 | | 6/2002 | Lim et al. |
| 2002/0181751 A1 | * | 12/2002 | Hale .......................... 382/128 |
| 2005/0015231 A1 | | 1/2005 | Edwards et al. |

FOREIGN PATENT DOCUMENTS

| | | |
|---|---|---|
| EP | 0 801 364 | 7/2003 |
| FR | 2 755 094 | 8/1999 |
| GB | 2326747 | 12/1998 |
| WO | WO 99/40532 | 8/1999 |
| WO | WO 99/52048 | 10/1999 |
| WO | WO 99/57418 | 11/1999 |
| WO | WO 02/01251 | 1/2002 |
| WO | WO 02/02901 | 1/2002 |
| WO | WO 02/03101 | 1/2002 |
| WO | WO 02/03103 | 1/2002 |
| WO | WO 02/03262 | 1/2002 |
| WO | WO 02/03263 | 1/2002 |
| WO | WO 02/03264 | 1/2002 |
| WO | WO 02/03265 | 1/2002 |

OTHER PUBLICATIONS

D. K. Kahaner et al., "An Expreimental Algorithm for N-Dimensional Adaptive Quadrature," Los Alamos Scientific Laboratory, ACM 0098-3500/79/0300-0086, Mar. 1979, pp. 86-96.

Y. Ozdogan, "Seismic Data Processing," Society of Exploration Geophysics, 1991, pp. 514-515.

S.O. Norris et al., "Modeling Fluid Flow Around Horizontal Wellbores," Texas A&M U., SPE 20719, 1990, pp. 65-75.

P. Perrochet, "Finite Hyperelements: A 4D Geometrical Framework Using Covariant Bases and Metric Tensors," John Wiley & Sons, Ltd., 1995, pp. 525-534, XP-008000072.

J.M.M. Regtien, et al., "Interactive Reservoir Simulation," Shell Research Rijswijk, SPE 29146, 1995, pp. 545-552.

C. Buckalew et al., "Oilfield Visualization on the PC Platform," ACM Vizolutions, Inc., CA Polytechnic U., SPE 62861, 2000, pp. 1-5 XP-002191281.

E. Farkas, "Linearization Techniques of Reservoir Simulation Equations: Fully Implicit Cases," MOL plc, SPE 37984 1997, pp. 87-95.

P. Benedeck, "Capacitances of Planar Multiconductor Configuration on a Dielectric Substrate by a Mixed Order Finite-Element Method," Bell Northern Research, IEEE Transactions on circuits and Systems, vol. 23, No. 5, 1974.

C. Fu, et al., "Time Integration Procedures for a Cyclic Thermoviscoplasticity Model for Pb-Sn Solder Applications," Georgia Inst. Technology, IEEE, 1996, pp. 403-413.

P.A. Forsyth et al., "Local Mesh Refinement and Modeling of Faults and Pinchouts," Computer Modeling Group Formation Evaluation, SPE 13524, 1986, vol. 1, No. 3, pp. 275-285, XP-002191830.

Y. Ding et al., "Development of Dynamic Local Grid Refinement in Reservoir Simulation," Inst. Francais du Petrole, SPE 25279, 1993, pp. 501-510, XP-002191831.

S. Verma et al., "A Control Volume Scheme for Flexible Grids in Reservoir Simulation," SPE 37999, 1997, pp. 215-227, XP-002191832.

S. Kocberber et al., "An Automatic, Unstructured Control Volume Generation System for Geologically Complex Reservoirs," Landmarks Graphic Corporation, SPE 38001, 1997, pp. 241-252, XP-002191833.

Y. Kuwauchi et al., "Development And Applications of a Three Dimensional Voronol-Based Flexible Grid Black Oil Reservoir Simulator," Mitsui Oil Exploration Co., SPE 37208, 1996, pp. 1-12, XP-002191834.

R.L. Page et al., "A Functional Program Describing a Simple Reservoir Model and Its Potential for Parallel Computation,"Amoco Production Company Research Center, IEEE, Apr. 1990, pp. 85-91.

C. Giersten, "Volume Visualization of Sparse Irregular Meshes," IBM Bergen Scientific Centre, IEEE Computer Graphics and Applications, vol. 2, No. 2, Mar. 1992, pp. 40-48.

S. Ghosh, "Curvilinear Local Grid Refinement," SPE 50633, 1998, pp. 29-43.

H. N. Sharpe et al., "A New Adaptive Orthogonal Grid Generation Procedure for Reservoir Simulation," SPE 20744, 1990, pp. 295-305.

P.J. Zwart et al., "Space-Time Meshing for Two-Dimensional Moving Boundary Problems," Dept. of Mechanical Engineering, U. of Waterloo, 1998, pp. 187-199.

M.J. Economides et al., "Petroleum Production Systems," Prentice Hall PTR, Upper Saddle River, New Jersey, 1993, Section 4-1, Production from Natural Gas, pp. 57-70, ISBN 013658683X.

U.S. Appl. No. 09/896,137, filed Jun. 29, 2001.

U.S. Appl. No. 09/896,136, filed Jun. 29, 2001.

U.S. Appl. No. 09/896,147, filed Jun. 29, 2001.

U.S. Appl. No. 09/896,132, filed Jun. 29, 2001, now U.S. Patent No. 6,941,255, issued Sep. 6, 2005.

S.L. Ho, et al., "Generation and Rotation of 3-D Finite Element Mesh for Skewed Rotor Induction Motors Using Extrusion Technique," IEEE Transactions on Magnetics, vol. 35, No. 3, 1999, pp. 1266-1269.

Y. Li et al., "Well-Bore Bottom Stress Concentration and Induced Core Fractures," AAPG Bulletin, vol. 81; No. 11, Nov. 1997, pp. 1909-1925.

J. Kim et al., "Numerical Simulation of the Noordbergum Effect Resulting From Groundwater Pumping in a Layered Aquifer System," Dept. of Geosciences, Journal of Hydrology 202, Feb. 1997, pp. 231-243.

P. Raskin et al., "Water Eval. and Planning System User Guide for Version 99," Stockholm Environmental Institute, Aug. 1999, pp. 1-2, 5-7, 60-61.

A. Doniger et al., "Meeting Notes: POSC General Meeting," Oct. 20-21, 1998, Houston, Texas, Agenda and Notes, pp. 1-4.

China Nat'l Petroleum Corp., Construction of an Integrated Petroleum E&P Software System Based on POSC-SIP, pp. 12, 44, unknown date.

P.A. Forsyth, "Control Volume, Finite Element Method for Local Mesh Refinement in Thermal Reservoir Simulation," U. of Waterloo, SPE 18415, 1990, pp. 561-566, Appendices, pp. 91-96.

H. S. Naji et al., "A Fully Implicit, Three-Dimensional, Two-Phase, Control-Volume Finite Element Model for the Simulation of Naturally Fractured Reservoirs," SPE 36279, 1996, pp. 1-13.

L.C. Young, "Rigorous Treatment of Distorted Grids in 3D," SPE 51899, 1999, pp. 1-14.

F. Cuisiat et al., "Petroleum Reservoir Simulation Coupling Flow and Deformation," SPE50636, 1998, pp. 63-72.

* cited by examiner

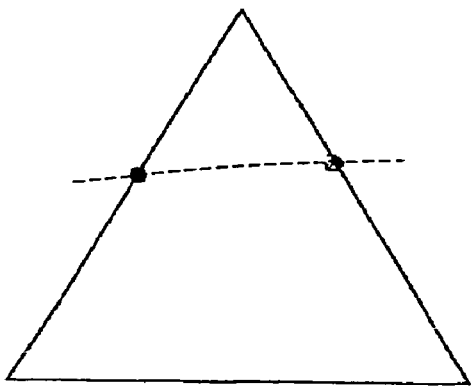
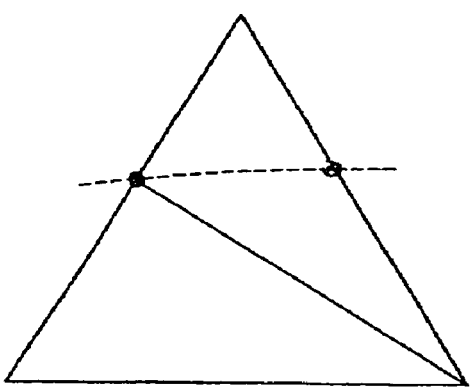
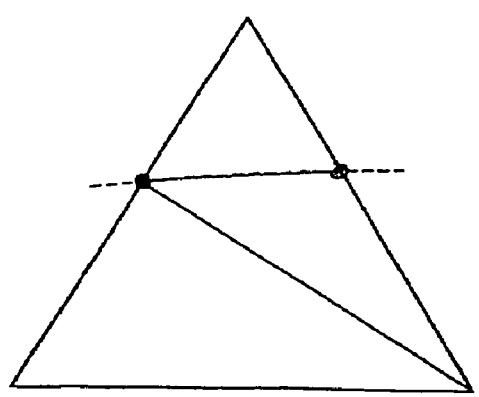
FIG. 23

METHOD AND SYSTEM FOR REPRESENTING RESERVOIR SYSTEMS

CROSS-REFERENCE TO RELATED APPLICATIONS

The present application claims priority from U.S. patent application Ser. No. 09/896,137, filed Jun. 29, 2001, entitled "METHOD AND SYSTEM FOR SOLVING FINITE ELEMENT MODELS USING MULTI-PHASE PHYSICS," naming inventor Stephen R. Kennon, and claiming priority from U.S. Provisional Patent Application No. 60/215,697, filed Jun. 29, 2000, entitled "METHOD AND SYSTEM FOR OIL RESERVOIR SIMULATION AND MODELING," naming applicants Edward J. Barragy, Scott A. Canann, Stephen R. Kennon, Kok-Thye Lim, Stuart W. Pond, Jr., and Steven B. Ward, which applications are incorporated by reference herein in theirs entirety.

The present application claims priority from U.S. patent application Ser. No. 09/896,136, filed Jun. 29, 2001, entitled "METHOD AND SYSTEM FOR HIGH-RESOLUSTION MODELING OF A WELL BORE IN A HYDROCARBON RESERVOIR," naming inventors Kok-Thye Lim, Steven B. Ward, and Stephen R. Kennon, and claiming priority from U.S. Provisional Patent Application No. 60/215,697, filed Jun. 29, 2000, entitled "METHOD AND SYSTEM FOR OIL RESERVOIR SIMULATION AND MODELING," naming applicants Edward J. Barragy, Scott A. Canann, Stephen R. Kennon, Kok-Thye Lim, Stuart W. Pond, Jr., and Steven B. Ward, which applications are incorporated by reference herein in theirs entirety.

The present application claims priority from U.S. patent application Ser. No. 09/896,147, filed Jun. 29, 2001, entitled "METHOD FOR MODELING AN ARBITRARY WELL PATH IN A HYDROCARBON RESERVOIR USING ADAPTIVE MESHING," naming inventors Steven B. Ward and Stephen R. Kennon, and claiming priority from U.S. Provisional Patent Application No. 60/215,697, filed Jun. 29, 2000, entitled "METHOD AND SYSTEM FOR OIL RESERVOIR SIMULATION AND MODELING," naming applicants Edward J. Barragy, Scott A. Canann, Stephen R. Kennon, Kok-Thye Lim, Stuart W. Pond, Jr., and Steven B. Ward, which applications are incorporated by reference herein in theirs entirety.

The present application claims priority from U.S. patent application Ser. No. 09/896,132, filed Jun. 29, 2001, entitled "FEATURE MODELING IN A FINITE ELEMENT MODEL," naming inventors Stephen R. Kennon and Steven B. Ward, and claiming priority from U.S. Provisional Patent Application No. 60/215,697, filed Jun. 29, 2000, entitled "METHOD AND SYSTEM FOR OIL RESERVOIR SIMULATION AND MODELING," naming applicants Edward J. Barragy, Scott A. Canann, Stephen R. Kennon, Kok-Thye Lim, Stuart W. Pond, Jr., and Steven B. Ward, which applications are incorporated by reference herein in theirs entirety.

FIELD OF THE DISCLOSURE

This disclosure, in general, related to methods and systems for representing reservoir systems.

BACKGROUND

Physical systems can be modeled mathematically to simulate their behavior under certain conditions. There are a wide variety of means to model these systems, ranging from the very simplistic to the extremely complicated. One of the more sophisticated means to model physical systems is through the use of finite element analysis. As the name implies, finite element analysis involves the representation of individual, finite elements of the physical system in a mathematical model and the solution of this model in the presence of a predetermined set of boundary conditions. Another comparable means to model physical systems is through the use of finite difference analysis. Finite difference analysis involves the modeling of individual points within a modeled space and computing the differences between these points. Finite difference analysis is often used for simulating the dynamic behavior of fluids.

Traditional finite difference techniques and finite element techniques using streamlined, upwinding methods are typically used to simulate the production of oil in a reservoir. While each of these techniques has its own advantages, it also has its own disadvantages. Generally speaking, the finite difference techniques produce physically realistic results, but they are not very accurate. The finite element techniques, on the other hand, are more accurate, but they produce results that are not physically realistic.

As a result of their respective disadvantages, both the finite difference techniques and finite element techniques that are conventionally used normally require a great deal of computer resources. In the case of finite difference techniques, reasonable accuracy can be achieved, but this requires many more nodes than would be desirable in a finite element model. This increases the amount of memory and CPU time to compute an accurate solution. In the case of finite element techniques, comparable accuracy can be achieved with fewer nodes, but the solutions may not be realistic. For example, concentrations may be more than 100 percent, or permeabilities may be negative. Consequently, there may be problems for which the solution does not converge, or for which the solution may converge very slowly. These techniques are therefore less reliable and may require a large number of iterations before acceptable accuracy is achieved.

Because each of these standard techniques has its own drawbacks, and because these drawbacks increase the amount of computer resources, which are used to generate acceptable solutions, it would be desirable to provide a method for modeling systems such as oil reservoirs which produces realistic solutions for these systems.

BRIEF DESCRIPTION OF THE DRAWINGS

The present disclosure may be better understood, and its numerous features and advantages made apparent to those skilled in the art by referencing the accompanying drawings.

FIG. 23 is a diagram illustrating the manner in which a two-dimensional simplex is adapted to form new simplices, which lie on either side of an intersecting boundary.

The use of the same reference symbols in different drawings indicates similar or identical items.

DESCRIPTION OF THE DRAWINGS

Figure 1:
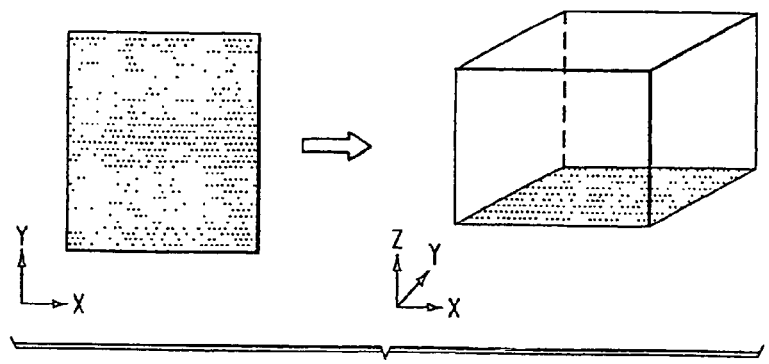
FIG. 1 is an illustration of the rectangular and hexahedral elements which comprise structured finite element meshes in the prior art.

Particular embodiments of the present method and system are directed generally to constructing and solving finite element models. More particularly, they are directed to the construction of finite element meshes and the refinement of these meshes so as to generate high resolution models of the interior of a surface defining a well bore, as well as of the volume of a reservoir in which the well bore may be located, such that the faces of some of the elements in the reservoir mesh are essentially coincident with the surface defining the well bore.

Broadly speaking, one embodiment of the present method comprises constructing an initial unstructured mesh of simplex elements filling a reservoir volume, defining a well bore trajectory within the reservoir, defining a well bore radius around said trajectory to define a surface a radial distance out from said trajectory enclosing the trajectory to form the well bore surface within said mesh, identifying intersections between the elements of the mesh and the well bore surface to be modeled, then redefining the intersected elements exterior to said surface to comprise faces coincident with the well bore surface, and to comprise new elements within the well bore surface defining a well bore mesh with some elements likewise having faces coincident with the well bore surface. More particularly, new nodes are located at the point of intersection and are used as the basis for subdividing the initial elements into new elements both within the well bore surface and outside of the well bore surface. The number of new elements that are created for a particular element depends upon the manner in which the surface intersects that element. The new elements are created in such a way that each is a simplex in the modeled space. The present method is employed in the generation of multidimensional finite element models. It should be noted that, while the examples described below include only 2-and three-dimensional meshes, the method is generally applicable in n dimensions.

It may be helpful before describing the present method in detail to define a few terms relating to finite element meshes:

A node is a point in space. In finite element modeling, nodes form the vertices of the elements that are modeled. The nodes also form part of a mesh of nodes and edges that define the boundaries between elements in the modeled space.

An edge is a line between two nodes that forms vertices of an element. The edges form part of the mesh that defines the boundaries between elements in the modeled space.

A simplex is a spatial configuration of n dimensions determined by n+1 in a space of dimension equal to or greater than n. In other words, a simplex is a geometric spatial element having the minimum number of boundary points to enclose a space in a given number of dimensions. For example, in two dimensions, a simplex comprises a triangle, together with the interior area bounded by the triangle (see FIG. 6). Two points are insufficient to form a simplex in two-dimensional space because no area is bounded by the points (and the lines that interconnect them.) While four points may be sufficient to bound a two-dimensional area, they do not comprise the minimum number of boundary points by which the two-dimensional area can be bounded. In three dimensions, a simplex comprises a tetrahedron, which is bounded by four vertices (see FIG. 6.) In four dimensions, a simplex comprises a hypertetrahedron (sometimes referred to as a hypertet) having five vertices.

A face is an (n−1)-dimensional surface of an n-dimensional element. For example, in a two-dimensional element, each of the lines that bounds the area of the element is a face of that element. In a three-dimensional element, each of the two-dimensional surfaces that bound the volume of the element is a face of that element. Preferably, the faces of at least some of the elements in a finite element model are located so that they are coincident with surfaces or boundaries within the modeled space.

A mesh is a collection of elements that fill a modeled space. These elements are representative of a system that resides in that space. Because each element can be defined by a plurality of nodes and/or the edges between those nodes, a mesh may alternatively be considered a collection of nodes and/or the edges between them. At various points in this disclosure, "mesh" will be used to alternately refer to collections of elements or nodes/edges, depending upon the context in which the term is used. The mesh may also be referred to herein as a finite element model or simply a model.

Some embodiments of the method and system have as a first step the generation of a mesh to model a reservoir in which will be located a well bore. This first step of generating the reservoir mesh can be accomplished by any of a variety of known methods, and in particular, using the method described in U.S. Published application No. 2002/0032550 A1, published Mar. 14, 2002 and incorporated herein by reference in its entirety, (the "Adaptice Mesh Application"). A description of this method of mesh generation is included below for ease of illustration. Another technique for generating a reservoir mesh in three dimensions is to extrude a two-dimensional mesh in the manner disclosed in related U.S. Pat. No. 6,674,432 entitled, "METHOD AND SYSTEM FOR MODELING GEOLOGICAL STRUCTURES USING AN UNSTRUCTURED FOUR-DIMENSIONAL MESH" filed on Jun. 29, 2001 (the "Extruding Application"). This publication is hereby fully incorporated by reference.

An embodiment of the method and system of this application comprises generating a reservoir mesh and then defining a well bore trajectory within the reservoir mesh. The well bore trajectory can be provided as an input to an algorithm comprising an embodiment of the system of this invention. The reservoir mesh likewise can be pre-generated and provided as an input. A value for the radius of the well bore from the center line of the trajectory is also provided. Further, a datum point can be provided as an input to be a reference point for the coordinate system used for the model.

Embodiments of the method and system can comprise defining the trajectory of the well bore, and the surface defined by a radius from the well bore center line, implicitly after taking as an input the generated reservoir mesh. Other embodiments generate a well bore and mesh explicitly by defining the well bore center line, the radius of the surface from the center line and generating a mesh within the well bore. In an explicitly generated well bore mesh embodiment, a next step can be to construct the reservoir mesh around the well bore mesh by any of the previously discussed methods, or by other methods such as the commercially available Inria meshing algorithm. The Inria algorithm can take as inputs one or more two-dimensional boundaries for the system being modeled and can generate a three-dimensional mesh based on a provided two-dimensional mesh of the system boundary(s).

As indicated above, finite element modeling involves the creation of a mesh of finite elements. The elements are defined by nodes within the problem space. The nodes are simply points in space. The lines between the nodes are referred to as edges. A structured mesh is defined in three dimensions so that the elements within the problem space are hexahedrons. For example, they may be cubes or rectangular prisms (equivalently, in two-dimensional problems, the elements would be rectangles—see FIG. 1 for an illustration of these elements). The edges of the hexahedrons are co-incident with the edges between the nodes of the mesh. In a simple model, the nodes of the mesh may be regularly spaced to define cubic elements. It is not desirable, however, for the nodes to be evenly spaced in all finite element models. A variety of different sizes and shapes of hexahedral elements can be defined within a single mesh. In contrast unstructured meshes are typically defined by non-hexahedron shaped elements, such as tetrahedral elements.

Figure 2:
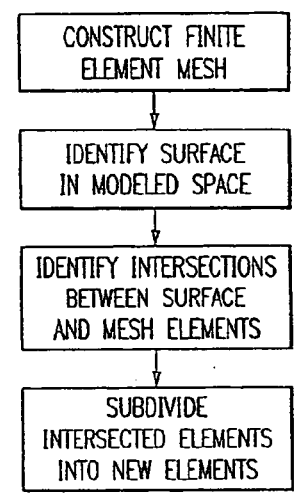
FIG. 2 is a flow diagram illustrating the basic steps of one embodiment of the present method.

Referring to FIG. 2, a flow diagram illustrating the basic steps of one aspect of an embodiment of the method is shown. Generally speaking, the adaptive meshing method comprises constructing an unstructured mesh corresponding to a space (e.g., a reservoir) that is being modeled, then identifying a surface in the modeled space (e.g., a well bore outer surface) and determining the intersections of the surface with the elements of the mesh, and finally defining new elements within the intersected elements so that one or more of the faces of the new elements are substantially coincident with the surface. ("Substantially coincident" is used herein to refer to element edges or faces for which the corresponding nodes lie on a curve or surface.) These faces approximate the modeled surface.

Each element in the mesh has a corresponding set of nodes that comprise the vertices of the element. Likewise, each element has a corresponding set of edges that connect the vertices. In the embodiments of the method of this invention, the intersection of a surface with an element is characterized by the points at which the surface intersects with the nodes and/or edges of the element. Consequently, identifying the intersection of a surface with the element comprises determining the points at which the surface intersects the nodes and/or edges. These points of intersection are then used as nodes for two or more newly defined elements. The new elements effectively include the intersecting portion of the surface as one of the faces of the new elements.

Figure 3A:
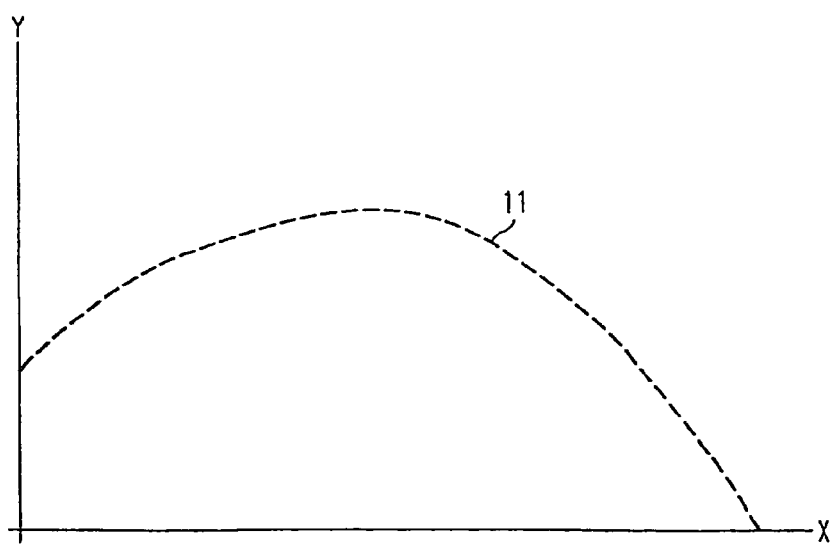
FIGS. 3A-3B are illustrations of a curve in two-dimensional space and an initial unstructured mesh that could be used as the basis for modeling the curve.
Figure 3B:
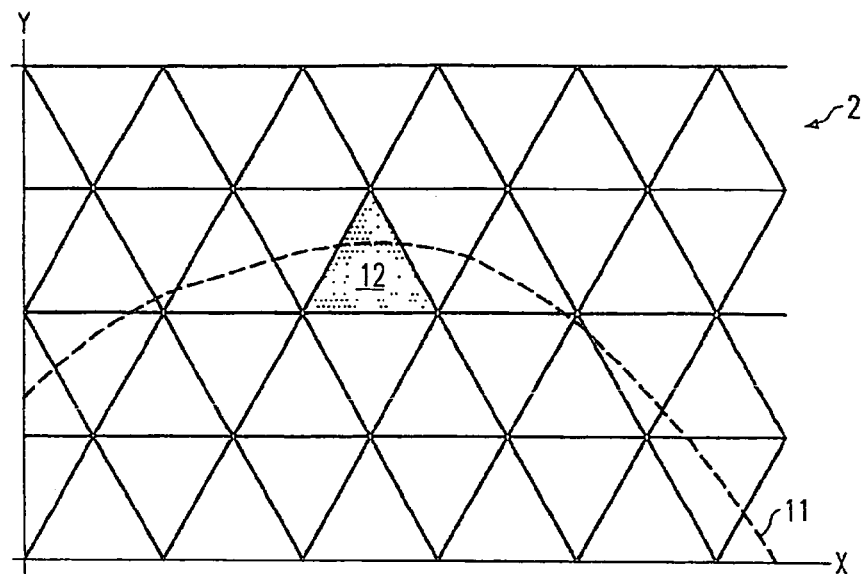

A two-dimensional example is illustrated in FIGS. 3-4. FIG. 3A shows a curve 11, which represents a surface in two-dimensional space. FIG. 3B shows a two-dimensional mesh 2 constructed to model the space containing curve 11. Mesh 2 comprises a series of triangular elements that are simplexes in two-dimensional space. One of the elements, identified by reference numeral 12, is highlighted—this element will be referred to in the following description of the manner in which the elements are subdivided. Although the elements in this initial mesh 2 are regular, it should be noted that the mesh is unstructured, and the elements may have any suitable size or shape (keeping in mind that they are to be simplexes.) Curve 11 is also shown in FIG. 3B.

It can be seen that the elements of initial mesh 2 do not follow curve 11. In other words, curve 11 does not lie substantially along the edges of the elements. Instead, curve 11 intersects a number of the elements, traversing some path across the space bounded by these elements. Because it is desired to construct a mesh in which the faces of the elements coincide with curve 11, it is desirable to modify or refine mesh 2. In the present embodiment, this is accomplished by effectively adding edges that lie on curve 11 (subdividing the existing elements into new elements that include the added edges.)

Figure 4A:
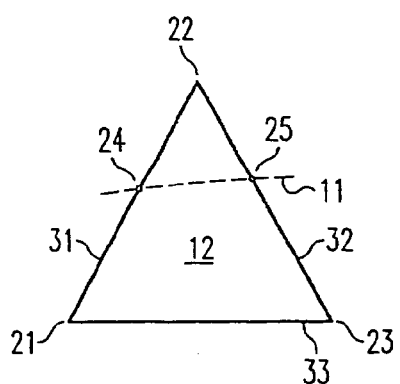
FIGS. 4A-4C are a set of diagrams illustrating the manner in which an element of the unstructured mesh of FIG. 3B is subdivided into sub-elements which can more accurately model the curve which intersects the original element.
Figure 4B:
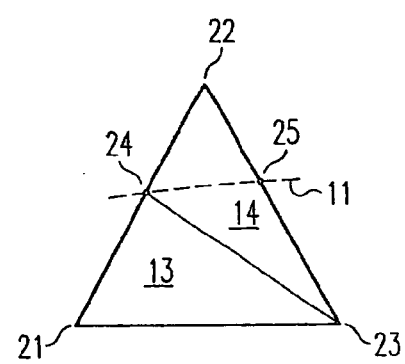
Figure 4C:
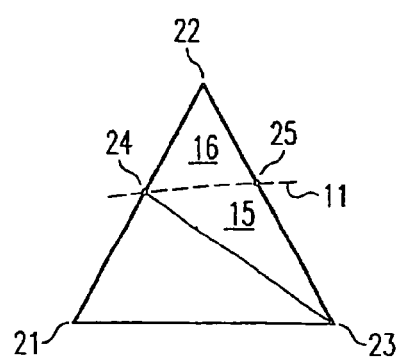

Referring to FIGS. 4A-4C, element 12 is shown apart from the mesh. A portion of curve 11 that intersects element 12 is also shown in FIG. 4A. Element 12 is defined by the three points (21, 22, 23) that form its vertices. The area within element 12 is bounded by the edges (31, 32, 33) that connect the vertices. As indicated above, it is desirable to identify the intersections between curve 11 and edges 31, 32 and 33. It is a relatively straightforward matter to calculate the intersections between curve 11 and the edges of an element 12 based upon the mathematical representation of each. It can be seen from FIG. 4A that curve 11 intersects edge 31 at point 24. Likewise, curve 11 intersects edge 32 at point 25.

An edge connecting points 24 and 25 would be substantially coincident with curve 11 in the space covered by element 12. That is, an edge connecting points 24 and 25 would closely approximate the portion of curve 11 that traverses element 12. Creation of an edge between points 24 and 25, however, would not, without more, be a sufficient refinement of the mesh because this would divide element 12 into a triangular area and a second area bounded by an irregular quadrilateral, which is not a simplex in two-dimensional space. The space covered by the quadrilateral is therefore be subdivided into simplexes (triangular elements.)

Referring to FIGS. 4B and 4C, the manner in which element 12 is subdivided into a plurality of new simplex elements is illustrated. Once the locations of points 24 and 25 are identified, element 12 is subdivided as follows: first, a node is placed at point 24 and an edge is created between this node and the opposite vertex of element 12 (point 23.) ("Opposite," as used here, refers to the vertex that is opposite the edge (31) on which the new node is located.) This creates new elements 13 and 14. Element 13 is defined by vertices at points 21, 23 and 24, while element 14 is defined by vertices at points 22, 23 and 24. A node is then placed at point 25 and an edge is created between this node and the node at point 24 (the opposite vertex of element 14.) This edge forms a segment of the modeled curve 11. As shown in FIG. 4C, the addition of this edge results in the creation of new elements 15 and 16. Element 15 is defined by vertices at points 23, 24 and 25, while element 16 is defined by vertices at points 22, 24 and 25.

Now, instead of having a single simplex element 12 that is intersected by curve 11 (and that does not have a face coincident with curve 11), there are three new elements (13, 15 and 16) each of which is still a simplex in two-dimensional space, and two of which share a face that lies on curve 11. This same process can be repeated with each of the original mesh 2 elements so that an edge is created wherever curve 11 traverses one of the elements. The result is an unstructured mesh of simplex elements that have edges that closely approximate the path of curve 11 and consequently enable the accurate modeling of the surface represented by curve 11.

Figure 5:
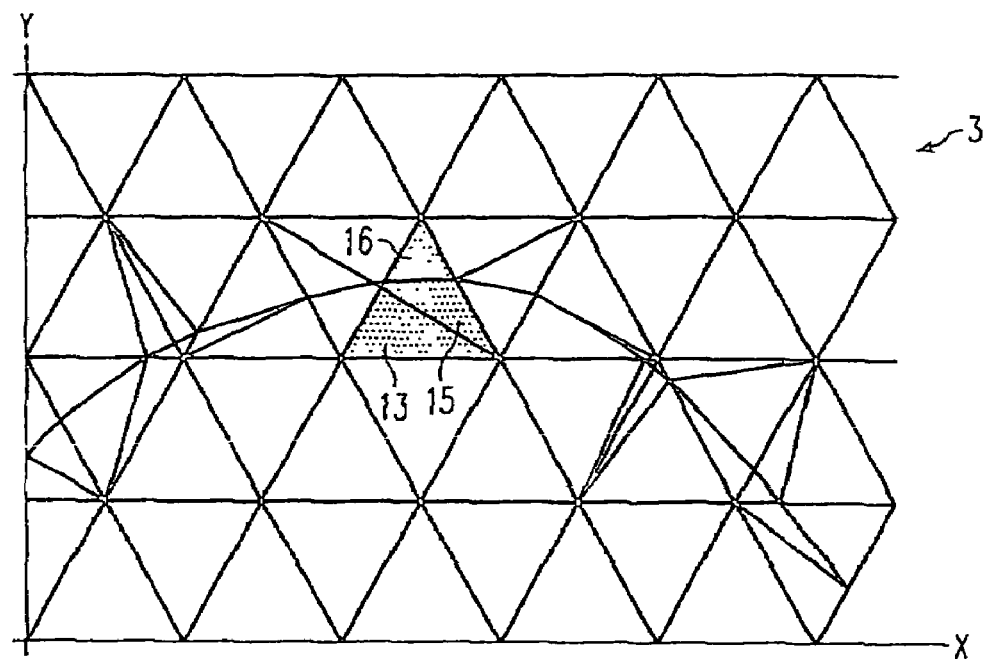
FIG. 5 is an illustration of a refined mesh which is adapted to model the curve shown in FIGS. 3A and 3B.

Referring to FIG. 5, the refined mesh 3 generated by applying the foregoing adaptive meshing method to each of the intersected elements of FIG. 3B is shown. The edges of the new simplexes that are substantially coincident with curve 11 are shown in heavy lines so they can be easily seen. It is apparent from FIG. 5 that the new edges provide a close approximation of the original curve 11. Curve 11 may be matched even more closely if mesh 2 is refined to use smaller elements before the adaptive meshing method of this invention is applied.

While each of the intersected elements of mesh 2 illustrated in FIG. 3B was intersected by curve 11 from one edge to another, it should be noted that the elements could also have been intersected at a node and an edge. That is, for a particular element, curve 11 could have traversed the element between one of its nodes and the opposite edge. In this case, it would only be desirable to make a single subdivision of the element by creating a new node where the curve intersects the edge, and then defining each of the new elements to include the intersected node, the new node, and one of the remaining nodes. For example, in the example of FIGS. 4A and 4B, if the curve had traversed the element from point 24 to point 23, a new edge between these points (and resulting elements 13 and 14) would have been sufficient.

There are actually two other cases that may be encountered. In one case, the surface may intersect only a single node of a simplex element. Because this node lies on the surface, there is no need to refine the element further. The surface may also intersect the element at two nodes. In this instance, the edge of the element already lies on the surface to be modeled, so no refinement of the element is desirable. (It should be noted that the identification of the type of intersection between the element and the surface may be regarded as a separate step of the method.)

The foregoing example is a very simple illustration of one embodiment of the adaptive meshing steps of the present invention in the context of a two-dimensional mesh. The more complex case of a three-dimensional mesh is illustrated below. Meshes of three and four dimensions are of particular interest in modeling physical systems over time. Because of the difficulty of illustrating four-dimensional systems, only the three-dimensional case will be described in detail below. The description of the three-dimensional case illustrates the manner in which the method can be extended to additional dimensions.

Figure 6:
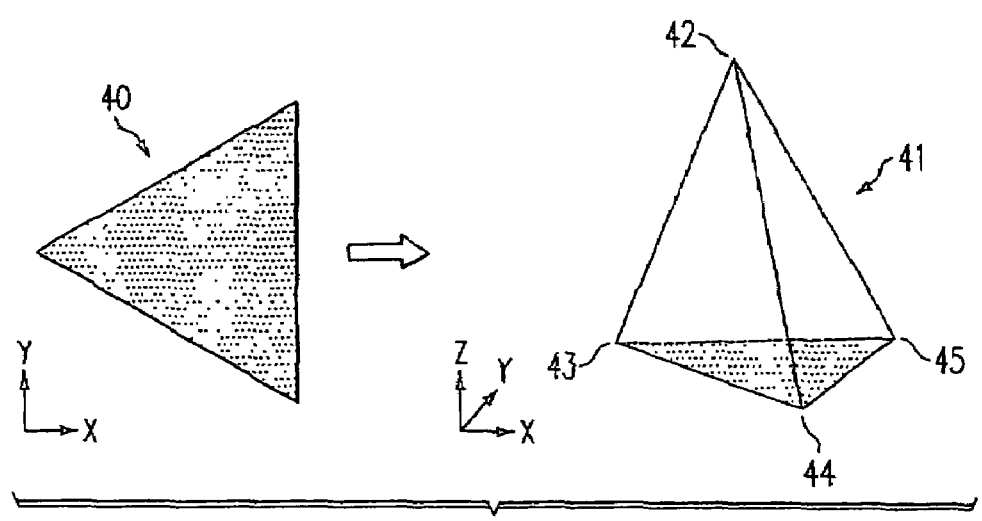
FIG. 6 is a diagram illustrating a three-dimensional simplex 41 in comparison with a two-dimensional simplex.

Referring to FIG. 6, a three-dimensional simplex 41 is shown in comparison to a two-dimensional simplex 40. Three-dimensional simplex 41 is defined by four vertices 42-45 and is bounded by the edges and faces between them. The application of the adaptive meshing algorithm of the present invention is more complicated in the three-dimensional case than in the two-dimensional case. One added complexity arises from the need to calculate the intersection of a three-dimensional surface with a three-dimensional element. While this requires additional computing power with respect to the two-dimensional case, it is still relatively straightforward. Another complexity is that the intersection of a surface and a simplex may involve four different cases that could necessitate the subdividing of the simplex: intersecting one node and two edges; intersecting two nodes and one edge; intersecting three edges; or intersecting four edges. Each of these cases is handled differently. (Remember that a curve in two dimensions can also intersect a simplex at one, two or three nodes, although no subdivision of the simplex would be required in these instances.)

Although more complex, the adaptive meshing steps of the method of this invention applied to three-dimensional meshes is generally the same as in the two-dimensional case—an initial mesh is constructed, a surface is identified, the intersections between the surface and the nodes/edges of the elements are identified, and the elements are subdivided using the intersections as nodes in the new elements. The three-dimensional method differs in that the step of subdividing an element is handled a bit differently for each of the four different types of intersections. (It should be noted that the present methods can be extended to four or more dimensions, but such cases will not be described here because of the difficulty of illustrating them clearly.)

Figure 7A:
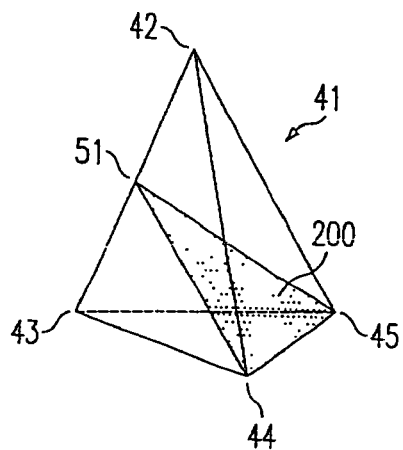
FIGS. 7A-7D are a set of diagrams illustrating the possible types of intersections between an approximately planar surface and a three-dimensional simplex.
Figure 7B:
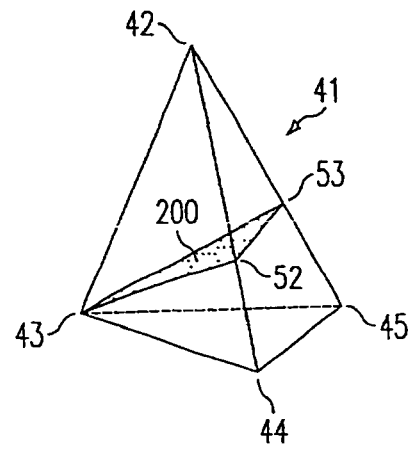
Figure 7C:
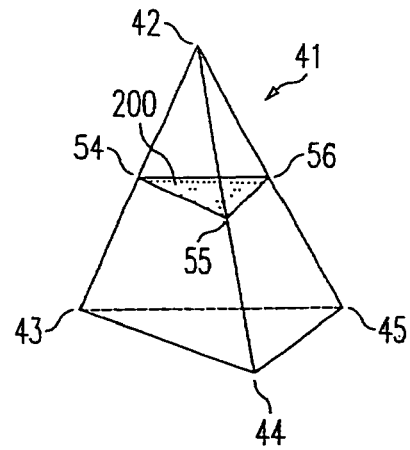
Figure 7D:
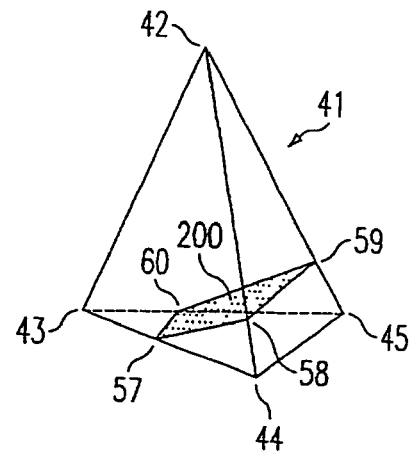

The four different types of intersections in three dimensions are illustrated in FIGS. 7A-7D. Each figure depicts the three-dimensional simplex element 41 of FIG. 6 intersected by a surface 200 having a different orientation. The shaded portion of each figure represents the portion of the surface 200 that intersects element 41. FIG. 7A shows the intersection of element 41 at two nodes (44 and 45) and one edge (51). FIG. 7B shows the intersection of element 41 at one node (43) and two edges (52 and 53). FIG. 7C shows the intersection of element 41 at three edges (54-56). Finally, FIG. 7D shows the intersection of element 41 at four edges (57-60). (It should be noted that surface 200 may also intersect the three-dimensional element 41 at one, two or three nodes. In the first two of these cases, surface 200 does not traverse element 41 and no subdivision of element 41 is desirable. In the third case, the face of element 41 already lies on the surface 200 and no further action needs to be taken.)

Referring to the intersection depicted in FIG. 7A, where the surface intersects the element at two nodes and one edge, the element is subdivided by creating a face between the two nodes (44 and 45) and the point of intersection on the edge (51). (A new node is located at the intersection point 51.) This results in the creation of two tetrahedra with the vertices {43, 44, 45, 51} and {42, 44, 45, 51}. Newly created face {44, 45, 51} is a facet of the surface which is being modeled.

Figure 8A:
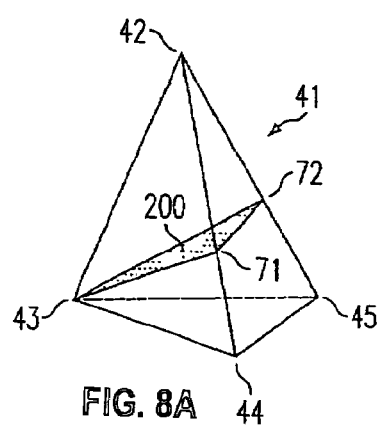
FIGS. 8A-8C are a set of diagrams illustrating the manner in which an the three-dimensional simplex of FIG. 7B is subdivided into sub-elements based upon its intersection by an approximately planar surface at one node and two edges.
Figure 8B:
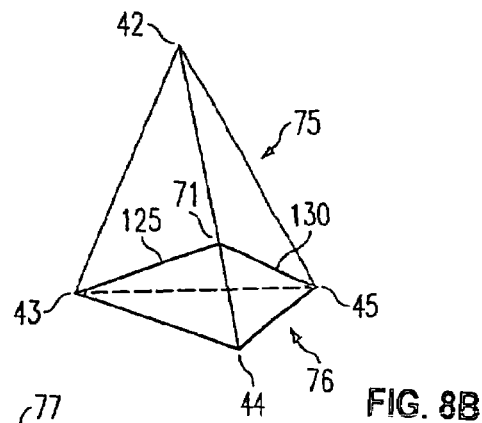
Figure 8C:
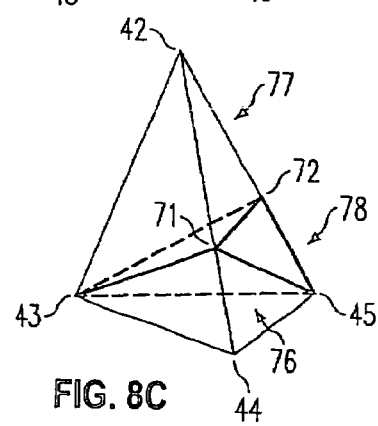

Referring to the intersection depicted in FIG. 7B, surface 200 intersects element 41 at one node and two edges. FIG. 7B is repeated as FIG. 8A for the convenience of the reader. The points of intersection with the edges of element 41 are indicated by reference numerals 71 and 72. The first step in subdividing element 41 is to select one of the points of intersection and to locate a node at that point. In this example, point 71 is selected. As shown in FIG. 8B, two new simplex elements, indicated by reference numerals 75 and 76, can be created using this new node by creating new edges 125 and 130 from it to the nodes at the vertices opposite from point 71. The first new element, 75, has vertices at {42, 43, 45, 71} and the second element, 76, has vertices at {43, 44, 45, 71}. The next step is to place a node at the remaining point of intersection (72). This node is used as the basis for subdividing element 75 into new elements 77 and 78 (see FIG. 8C.) Element 77 has vertices at {42, 43, 71, 72} and element 78 has vertices at {43, 45, 71, 72}. Thus, the subdivision of element 41 in this case results in the creation of new elements 76, 77 and 78. The face which separates elements 77 and 78 forms a face that is substantially coincident with the modeled surface 200. Element 41 is subdivided so as to create the minimum number of simplex elements, with nodes at each of the points of intersection, and such that the intersecting surface 200 is substantially coincident with the face of a new element.

Figure 9A:
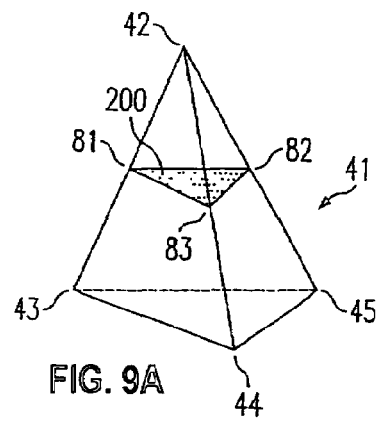
FIGS. 9A-9D are a set of diagrams illustrating the manner in which the three-dimensional simplex of FIG. 7C is subdivided into sub-elements based upon its intersection by an approximately planar surface at three edges.
Figure 9B:
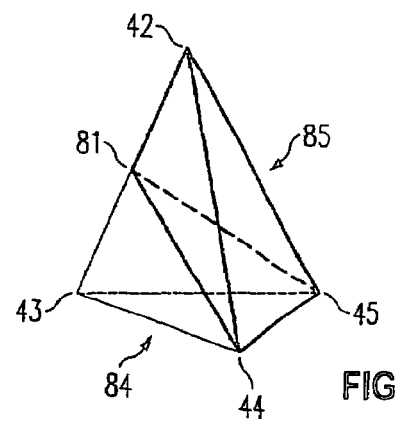
Figure 9C:
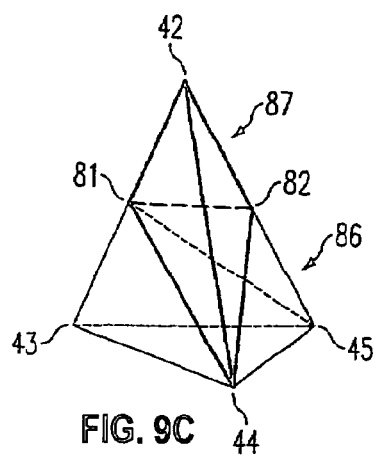
Figure 9D:
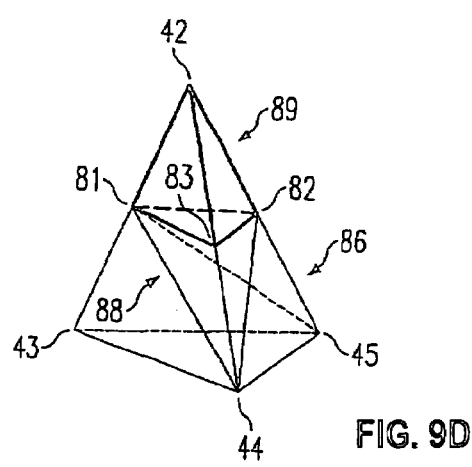

Referring to the intersection depicted in FIG. 7C, surface 200 intersects three edges of element 41. FIG. 7C is repeated as FIG. 9A for the convenience of the reader. The points of intersection between surface 200 and element 41 are indicated by reference numerals 81, 82 and 83. The process of subdividing element 41 in this case is very similar to the previous case—nodes are sequentially located at the points of intersection and new elements are created based on the addition of each node and edges from each new node to the vertices opposite from each new node along a face on which the new node lies. For example, as shown in FIG. 9B, a first node is located at point 81, creating elements 84 and 85. Element 84 has vertices at {43, 44, 45, 81} and element 85 has vertices at {42, 44, 45, 81}. Then, a node can be placed at the next point of intersection (82). This node is used to subdivide element 85, creating new elements 86 and 87, as shown in FIG. 9C. Element 86 has vertices at {44, 45, 81, 82} and element 87 has vertices at {42, 44, 81, 82}. Finally, a node is placed at the last point of intersection (83). Using this node, element 87 is subdivided into new elements 88 and 89, as indicated in FIG. 9D. Element 88 has vertices at {44, 81, 82, 83} and element 89 has vertices at {42, 81, 82, 83}. Thus, in this case, element 41 is subdivided into four new elements—84, 86, 88 and 89. The face which separates elements 88 and 89 forms a facet of the intersecting surface 200 and is substantially coincident with surface 200.

Figure 10A:
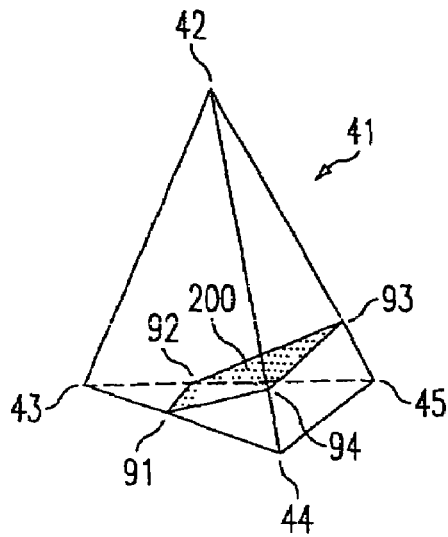
FIGS. 10A-10C are a set of diagrams illustrating the manner in which an the three-dimensional simplex of FIG. 7C is subdivided into two sub-elements based upon its intersection by an approximately planar surface at four edges.
Figure 10B:
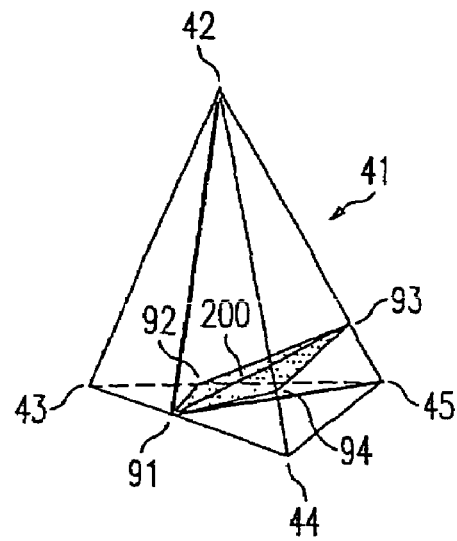
Figure 10C:
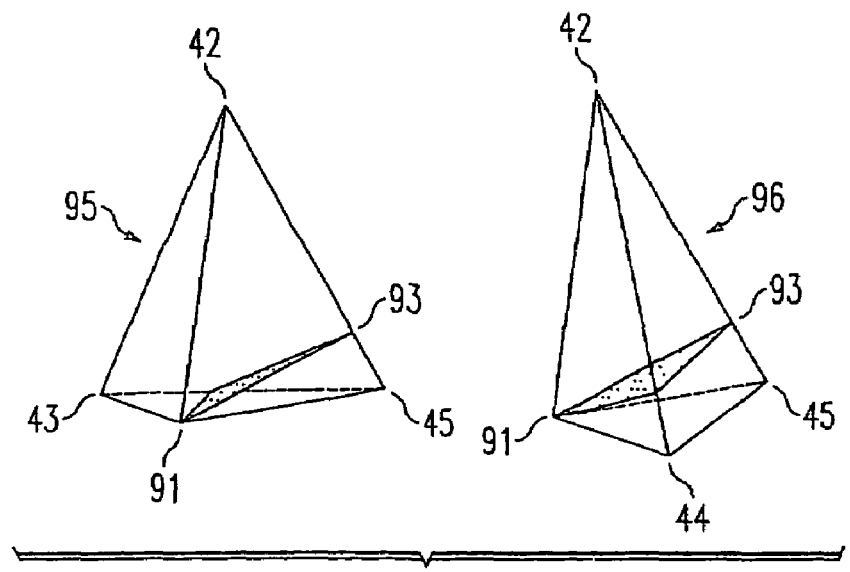

Referring to the intersection depicted in FIG. 7D, the surface intersects four edges of element 41. FIG. 7D is repeated as FIG. 10A for the convenience of the reader. The points of intersection between surface 200 and element 41 are indicated by reference numerals 91, 92 93 and 94. The subdivision of element 41 is illustrated in FIGS. 10A-10C, 11A-11C and 12A-12C. It should be noted that the first step in subdividing element 41 creates two new elements, 95 and 96, each of which is intersected by surface 200 at one node and two edges. This is illustrated in FIGS. 10B-10C. Each of these new elements can then be subdivided in the manner illustrated in FIGS. 7B-7C. The subdivision of elements 95 and 96 is shown in FIGS. 11A-11C and 12A-12C.

Figure 11A:
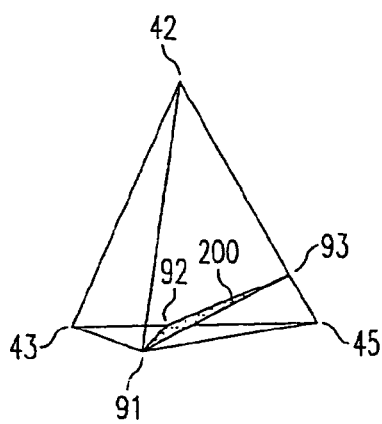
FIGS. 11A-11C are a set of diagrams illustrating the manner in which a first one of the sub-elements of FIG. 10C is further subdivided into sub-elements.
Figure 11B:
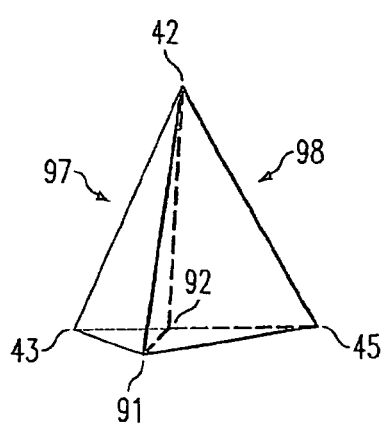
Figure 11C:
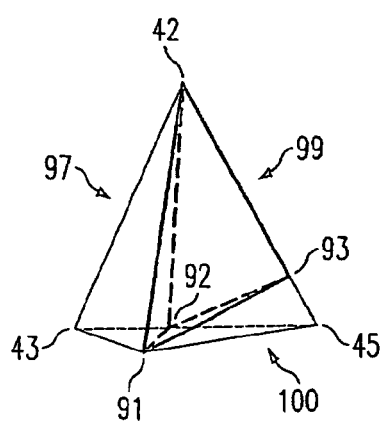

Referring to FIGS. 11A-11C, the subdivision of element 95 is illustrated. First, a node is placed at point 92, and two new elements incorporating this node are created. These are elements 97 and 98. The vertices of element 97 are at {42, 43, 91, 92} and the vertices of element 98 are at {42, 45, 91, 92}. Then, a node is placed at point 93. Based on this new node, element 98 is broken down into two new elements, 99 and 100. Element 99 has vertices at {42, 91, 92, 93} and element 100 has vertices at {45, 91, 92, 93}. The face of elements 99 and 100 which is formed between points 91, 92 and 93 forms a facet of the modeled surface 200.

Figure 12A:
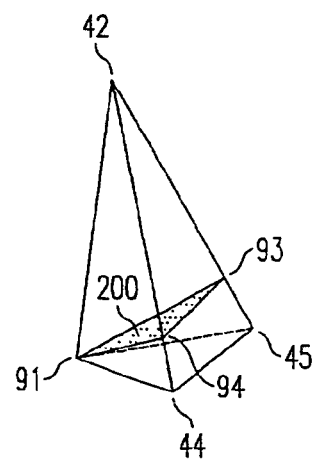
FIGS. 12A-12C are a set of diagrams illustrating the manner in which the second one of the sub-elements of FIG. 10C is further subdivided into sub-elements.
Figure 12B:
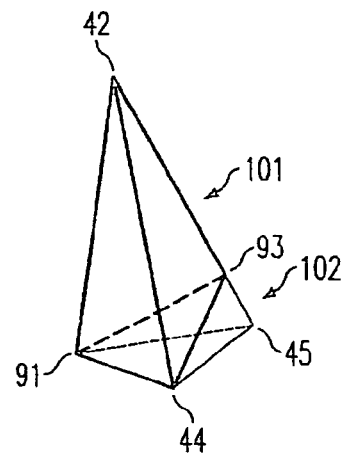
Figure 12C:
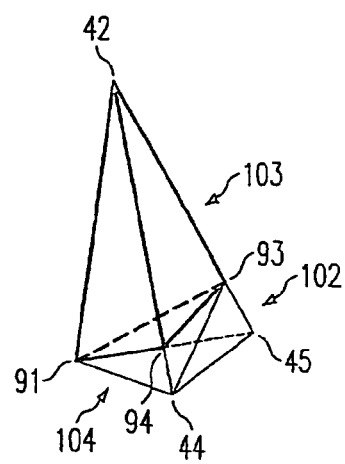

Referring to FIGS. 12A-12C, the subdivision of element 96 is illustrated. The first step is to place a node at point 93. Based on this node, two new elements are created. These elements are indicated by the reference numerals 101 and 102. The vertices of element 101 are at {42, 44, 91, 93} and the vertices of element 102 are at {44, 45, 91, 93}. Next, a node is placed at point 94. Using this new node, element 101 is broken down into two new elements, 103 and 104. Element 103 has vertices at {42, 91, 93, 94} and element 104 has vertices at {44, 91, 93, 94}. The common face of elements 103 and 104 which lies between points 91, 93 and 94 forms another facet of the modeled surface.

One application of the adaptive meshing steps of this invention described above involves the modeling of a well bore that follows an arbitrary path through a reservoir. In prior art systems, well bores were typically assumed to be aligned with the structured mesh which was used to model the reservoir. Then, functions approximating the behavior of the reservoir in the vicinity of the well bore were used for the elements containing the well bore when the model was solved. Generally speaking, these functions do not model the well bore as accurately as if the well bore surface were represented by the faces of the mesh elements and the well bore volume itself were modeled with a mesh. These prior art methods were not at all well suited to modeling well bores having arbitrary paths.

The embodiments of the method and system of the present invention can be used to accurately model a well bore in a reservoir by refining the elements of a finite element mesh to define element faces that are substantially coincident with a well bore surface defined by a predetermined radius from the well bore centerline. This is true even if the well bore follows an arbitrary path through the reservoir. The well bore surface is simply defined mathematically, and then the mesh is refined as described above. Further, in the same manner, the embodiments of this invention generate a mesh within the volume defined by the well bore surface to model the well bore with a greater resolution than previous such methods and systems.

In one embodiment, a well bore is defined implicitly by providing as inputs a reservoir mesh, a well bore trajectory and a well bore radius. The well bore trajectory is the path of the well bore through the reservoir and can comprise a set of connected points that are ordered by measured depth within the reservoir. The radius is a predetermined value for the radius of the well bore. The well bore surface can therefore be characterized mathematically in one embodiment by a function $F(x, y, z)-r=0$, where $F(x, y, z)$ is the distance from a point in the reservoir to the trajectory of the well bore and r is the radius of the well bore. For each of the edges in the finite element reservoir mesh, or a portion of the edges that are within the vicinity of the well bore, intersections with the defined well bore surface are identified. The points at which the edges are intersected by the well bore surface are marked for refinement. The elements containing the marked edges are then refined as described above. It should be noted that the elements for which four edges are intersected can be refined first to improve computational performance. In order to maintain surface preservation, no adjacent elements having four intersected edges are refined in a single pass. If such adjacent elements are identified, one is identified for default to a subsequent refinement pass of the algorithm of this invention. It may, therefore, take several passes to complete the refinement of these elements. Once the elements having four intersection edges are refined, the remainder of the intersected elements can be refined in a single pass.

It should be noted that the reservoir mesh elements intersected by the well bore surface are subdivided according to the teachings of this invention such that some newly created mesh elements exist entirely outside of the volume bounded by the well bore surface and others entirely within the volume bounded by the well bore surface, but none of the elements of the initial mesh remain intersected by the well bore surface. In this way, a separate well bore mesh is defined for which the properties at different nodes can be separately determined (and altered) to aid in predicting behavior within the well bore itself, independently of the rest of the reservoir. The steps of creating a well bore mesh within the well bore volume can be embodied as a distinct algorithm from that used to create the initial reservoir mesh. Both sets of steps, however, or the algorithms embodying those steps, can be combined to form a single executable software program and method.

Because the path of the well bore through the reservoir can be arbitrary, it is desirable to define a coordinate system that is convenient for both defining the well bore and identifying the intersection of the well bore surface with the elements of the reservoir mesh. In one embodiment, a coordinate system that tracks the path of the well bore can be used. This coordinate system identifies points along the well bore using the measured depth in the well bore, an angular distance from a normal vector, and a radial distance from the center of the well bore.

The well bore path can be assumed to comprise a series of segments, each of which is essentially straight. Adjacent segments are joined at joints to form a continuous well path. Because adjacent segments are not coaxial, the coordinate system accounts for the fact that some points near the joints may not be well defined. (That is, the coordinate system defined with respect to adjacent segments may overlap on one side of the joint and may not cover all points on the opposite side of the joint.) Consequently, a region corresponding to each segment is defined so that the region extends to a bisecting plane between that segment and an adjacent segment. This eliminates overlapped or undefined areas. (It should be noted that, for a segment at the end of the well bore, the end of the segment region near to an adjacent segment is bounded by the bisecting plane between the segments, but the other end of the segment region is bounded by a plane normal to the trajectory of the segment.)

As indicated above, the coordinate system for each segment includes a measured depth, an angular distance from a normal vector and a radial distance from the path of the well bore. The measured depth of points on the trajectory itself are well-defined. The measured depth of points which are on the inside or outside of curves in the trajectory, however, are not so well-defined. Consequently, the following method for determining the measured depth of these points can be imposed on the system.

Figure 13:
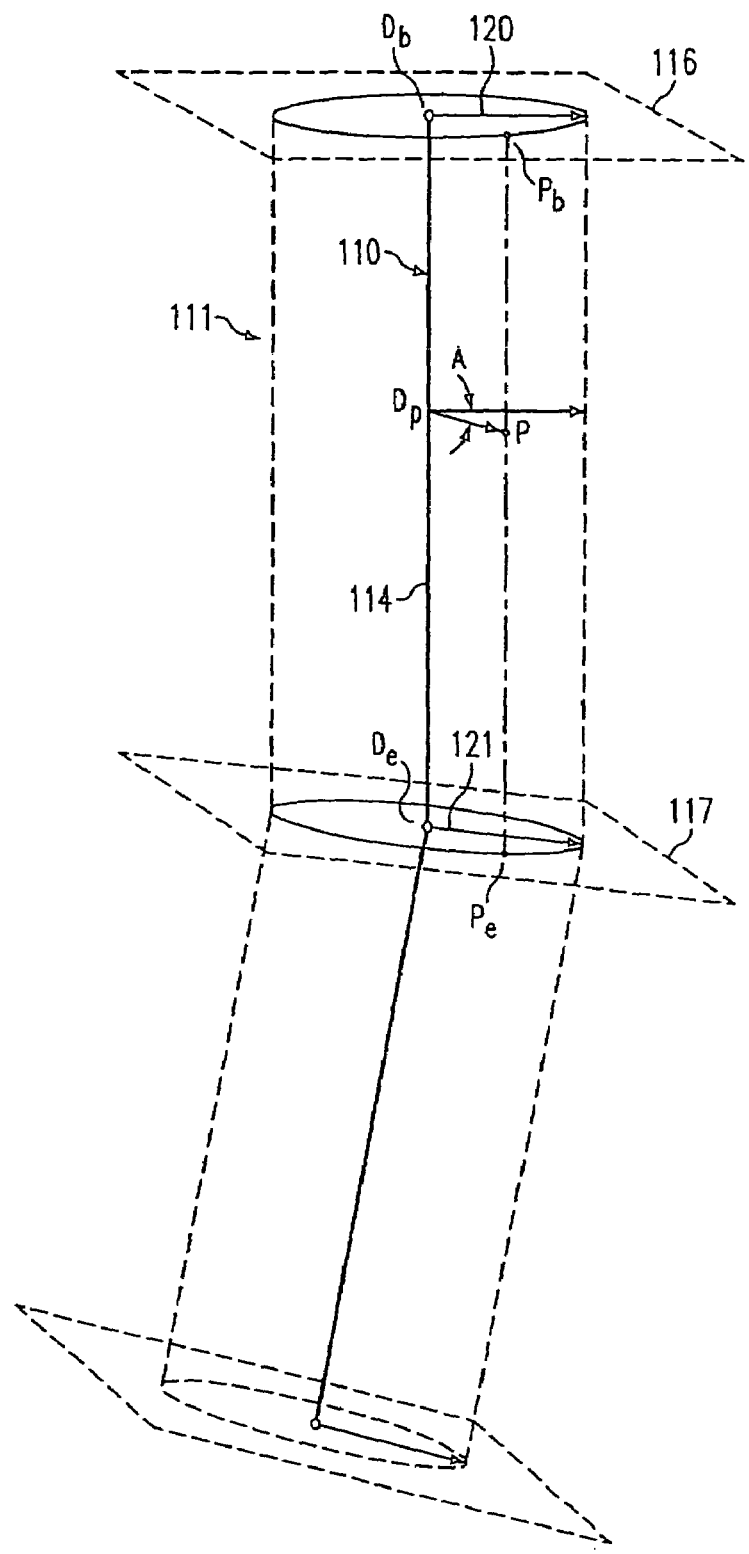
FIG. 13 is a diagram illustrating a well bore trajectory and the well bore surface defined by the trajectory.

Referring to FIG. 13, a diagram illustrating a well bore trajectory 110 and the well bore surface 111 defined by the trajectory is shown. A segment trajectory 114 has a beginning depth $D_{.sub.b}$ and an ending depth $D_{.sub.e}$. For a given point P in the segment, the point is first projected onto the bisecting (or terminating) planes 116, 117 at the ends of the segment. The projection at the beginning of the segment can be indicated by $P_{.sub.b}$ and the projection at the end of the segment can be indicated by $P_{.sub.e}$. The distance between these two projections of the point is then mapped onto the distance between the beginning and ending depths of the trajectory. In other words, the measured depth at point P ($D_{.sub.p}$) can be calculated as $D_{.sub.p}=D_{.sub.b}+(P-P_{.sub.b}).times.(D_{.sub.e}-D_{.sub.b})/-(P_{.sub.e}-P_{.sub.b})$. Thus, effectively, the depth along the well bore trajectory is "stretched" along the outside of curves in the trajectory and "compressed" along the inside of curves in the trajectory.

It should also be noted that the normal vector for a segment may become ill-defined if it is not translated from one segment to another. For example, the trajectory of the well bore may curve so that the trajectory is parallel to the original normal vector. Consequently, the normal vector for each segment of the trajectory is defined as follows. First, at the beginning of the well bore, a normal vector 120 is defined. This vector extends in an arbitrary direction from the well bore trajectory. The normal vector is then projected onto the bisecting plane 117 at the end of the initial segment of the well bore. The projected vector 121 is then carried through to the next segment of the trajectory and made normal to the trajectory in that segment. This process is repeated from segment to segment throughout the well bore. The angular coordinate A of a point in any of the segments can then be measured from the normal vector in the respective segment. The radial distance from the well bore path is calculated in a straightforward manner—it is simply the closest distance from the trajectory of the segment. In one embodiment, each node near the well bore is converted to the well bore coordinate system, and the converted coordinates are stored with the node. Thus, the coordinate transformation is performed only once, and the coordinates of each node are available in the original and transformed coordinate systems.

In the foregoing manner, a well bore having an arbitrary path defined by the trajectory $F(x,y,z)$ and radius r can be characterized in a convenient mathematical form. The nodes of the finite element mesh in the vicinity of the well bore can also be characterized using this same local coordinate system. This facilitates identification of the intersections between the well bore surface and the elements of the reservoir mesh. Once the points of intersection between the elements' edges and the well bore surface are identified, the elements are refined as described above. In this manner, an arbitrary-path well bore can be accurately modeled in an unstructured finite element mesh. It should be noted that another application of the adaptive meshing steps of the embodiments of the method and system of this invention can comprise refining the reservoir and well bore finite element meshes to increase the accuracy of a solution for each mesh. This refinement method and system are disclosed in the related Adaptive Meshing Application referenced above.

In operation, one embodiment of the method of this invention can comprise a user first generating a mesh model of the reservoir and then providing as an input the trajectory of a well bore within the reservoir mesh. The well bore trajectory can be provided by field engineers who know the geometry of the reservoir and the trajectory of the well. For example, a well bore model could be generated prior to actually sinking a well or once a well has already been drilled and is in operation. The well bore trajectory defines the path of the well bore center line. As discussed above, one embodiment of the method and system of this invention implicitly defines a well bore within an existing tetrahedral mesh simulating a reservoir by constructing an isosurface having a radius equal to the well bore radius. The result is a cylindrical surface in the case of a completely vertical well bore. However, more typically, with an arbitrary well path, the well bore surface can be thought of as a series of connecting cylindrical surfaces such as shown in FIG. 13. The cylindrical surfaces are defined by a radius around the well bore trajectory. The well bore trajectory can be defined by as many individual points, interconnected by lines (edges) as desirable to achieve a desired resolution. The depth of the well bore can be indicated as a measured depth, corresponding not to an absolute distance from the surface, but rather to the distance traveled along the well bore trajectory. Thus, in a non-completely vertical well bore, the defined well bore surface becomes a curvy cylinder (e.g., a kinked-up vertical cylinder).

As discussed above, the well bore path can be described using a set of X,Y,Z coordinates, where Z can be the measured depth of the well bore. According to one embodiment of the method and system of the present invention, a mesh can be generated inside of the well bore from the existing tetrahedron mesh defining the reservoir, in accordance with the description previously provided. Where the surface defining the well bore intersects the existing tetrahedron of the reservoir mesh, the method of this invention can be used to generate a new tetrahedron mesh completely within the well bore isosurface and distinct from the reservoir mesh outside the isosurface. This way, tetrahedrons that were initially intersected by the well bore isosurface can be subdivided into new tetrahedrons wholly inside and wholly outside the well bore. The well bore surface is thus defined by the shared faces of tetrahedron totally inside the well bore with those outside of the well bore.

New nodes created in accordance with the teachings of this invention at the isosurface defining the well bore, as well as within the well bore and outside of the well bore, can be used as solution points for the various properties in and around the well bore. It is important to note that the mesh defining the reservoir can be pregenerated by any currently existing meshing methods, including that disclosed in the Adaptive Meshing Application. It is further important to note that in the implicit embodiment of the method of this invention, the step of defining the trajectory of the well bore can comprise applying the adaptive meshing of the method of this invention to the initial reservoir mesh along the defined trajectory center line. The reservoir mesh can be adapted using the intersections of the well bore center line with the existing reservoir mesh tetrahedron. The resulting reservoir mesh can then be adapted again for the well bore surface defined by the radius from the well bore trajectory center line and the measured depth. The well bore mesh can thus be generated by first applying the adaptive meshing described in the Adaptive Meshing Application to the intersections of the existing reservoir mesh with the defined center line, and then secondly, to the intersections of the newly-generated reservoir mesh with the defined isosurface at a radius r from the trajectory center line.

It is important to note that the well bore isosurface created in the manner described above will not have an ideal top-view cross section of a circle (i.e., a two-dimensional representation of the cylinder). Topologically, the isosurface will be a circle, but it is composed of discrete models of continuous tetrahedrons and thus is not a true circle. However, the approximation can be made better based on the resolution desired for a particular application. The issue becomes one of mesh quality and can be individually configured for a given application. Typically, the approximation of the isosurface will have satisfactory resolution as a result of just the application of the adaptive meshing algorithm as described. However, in the event that a finer resolution is desired, the well bore and/or reservoir mesh can be refined in a manner as disclosed in the Adaptive Meshing Application to increase the general quality of the mesh.

Figures 14A, 14B:
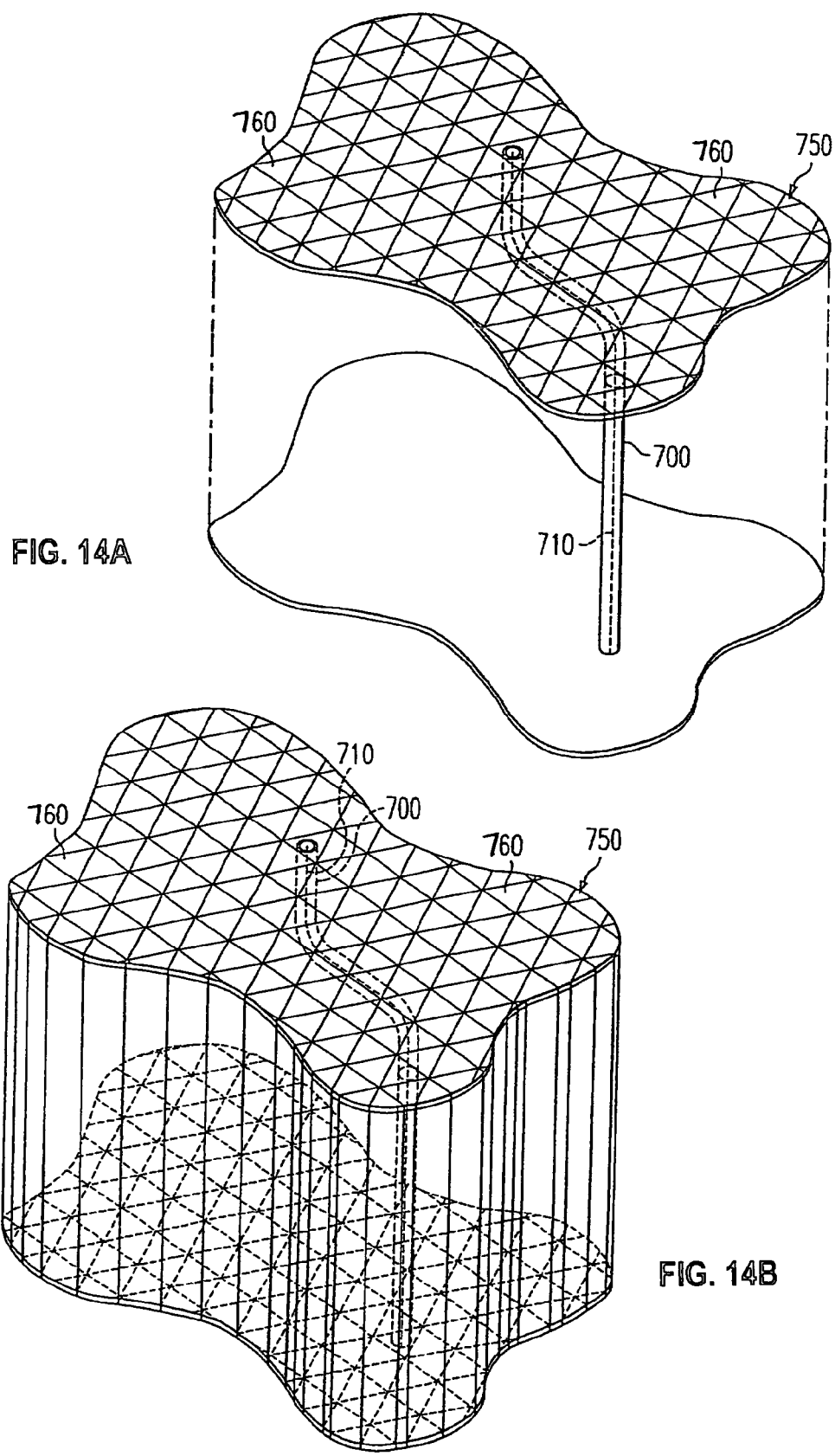
FIGS. 14A and 14B are diagrams illustrating another embodiment of a representation of a well bore.

The method and system of the present invention can be used to model a well bore having any orientation, and any arbitrary path within a reservoir. Further any spacing of line segments to define the trajectory can be accommodated, as can any radius as required for a given application. FIGS. 14A and 14B illustrate another embodiment of the method and system of the present invention in which the well bore is defined explicitly. In FIG. 14A, well bore 700 is explicitly defined by generating a mesh along a predefined well bore trajectory 710. A mesh for well bore 700 is defined inside of the boundary of reservoir 750 prior to the generation of the reservoir mesh. Reservoir 750 thus initially only has its boundaries defined (by two-dimensional mesh 760).

The method and system of the present invention can generate a mesh to model reservoir 750 by adapting mesh 760 in accordance with the adaptive meshing techniques previously discussed. Alternatively, mesh 760 can be converted from a two-dimensional mesh to a three-dimensional mesh by means of other meshing techniques, such as the commercially available Inria meshing algorithm. Using such a commercially available meshing algorithm, a user can provide a two-dimensional triangulation to bound a reservoir volume. The software then fills the reservoir volume with tetrahedron in such a way that the triangles that existed on the surface triangulation input by the user are maintained. Each of the triangles on the two dimensional surface triangulation will form a face of one of the volume tetrahedra. This embodiment of the method and system of this invention can thus explicitly define a well bore mesh and its resulting isometric surface and then fill in the reservoir mesh around the well bore mesh. Tetrahedra are thus explicitly proscribed along the defined well bore. The tetrahedron defining the well bore will have triangular surfaces forming the isosurface of the well bore. These triangles on the isosurface can be inputs to the reservoir meshing algorithms, such as Inria, and form part of the surface triangulation that will be maintained by the meshing algorithm when generating the reservoir mesh. In essence, a reservoir volume with a long, skinny hole within it is provided as an input and the meshing algorithm for the reservoir fills in the surrounding volume. Additionally, multi-layer reservoirs can also be provided as inputs with the well bore trajectory going from one layer through and to another layer. The meshing algorithm can generate a mesh for each layer as if they were each separate reservoirs. The boundary between layers then becomes one of the surfaces. FIG. 14B shows the reservoir mesh in place around the well bore.

Figure 15:
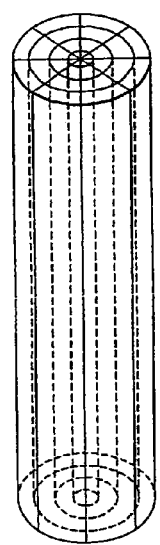
FIG. 15 is a diagram illustrating an exemplary well bore representation.

In this embodiment of the method and system of the present invention, the well bore trajectory and radius are first defined and then a series of concentric circles of decreasing radius can be defined inside the well bore radius such that if they were to be cut out and separated, they would form a series of concentric tubes in the shape of, and of a corresponding length to the well bore trajectory. The method and system of this invention then comprises a step of dividing the concentric cylindrical tubes along a series of lines bisecting by the well bore center line, as shown in FIG. 15. The result is a series of pie-sliced prisms that can then each be subdivided into tetrahedra in accordance with the teachings of this invention. The adaptive meshing algorithm of the method and system of the present invention is used to generate the tetrahedra that will then comprise the well bore mesh. The adaptive meshing algorithm can similarly be used to redefine the well bore mesh in the event that it passes through separate layers of a multi-level reservoir.

The method and system of this invention can be extended out to greater dimensions, such as the time dimension, using the method disclosed in the Extruding Application. Additionally, an advantage of the embodiments of the method and system of this invention is that they can eliminate the need for user expertise in the field of meshing. For example, a user need only have enough knowledge to input the well bore trajectory, the diameter or radius of the well bore, and the two dimensional triangulation for the surface of the reservoir to be modeled. The algorithms of the embodiments of the present invention, along with an adaptive meshing algorithm such as that disclosed in the Adaptive Meshing Application, or a commercial application such as Inria, can then fill and in generate the desirable meshes. Unlike prior art methods, a large amount of personnel time is not desirable to generate the model meshes. Further, commercial products such as Inria can be used in any embodiment of the method and system of the present invention to generate the reservoir mesh.

The algorithms of the method and system of the present invention can comprise computer executable software instructions and can be stored in memory such as RAM or ROM or any other fixed media, such as a hard drive. The computer executable software instructions of the embodiments of this invention can comprise a part of a larger set of computer-executable software instructions, but can act independently. The method and system of the present invention can be used with a computer graphical user interface, such as that disclosed in related U.S. Published application No. 2002/0067373 A1, entitled "SYSTEM AND METHOD FOR DEFINING AND DISPLAYING A RESERVOIR MODEL," published on Jun. 6, 2002 (the "Work Flow Application"), and incorporated herein by reference in its entirety. Further, the inputs desirable for the algorithms of the present invention can be provided directly by a user or can themselves be computer executable software instructions received through a network, or input from some other medium such as a floppy disk or hard drive or other software program, such as an Excel spreadsheet.

One embodiment of the method and system of the present invention can explicitly generate a well bore (as discussed above) for the specific case of a vertical well. In such a case, flow around the well bore is essentially radial. In this situation, using the explicitly defined mesh for the well bore path provides a more suitable mesh for the radial flow condition in that the mesh itself is based on a radial physical configuration. The mesh is designed to more closely resemble the physical system being modeled. Further, the radial transform method of related U.S. Published Application No. 2002/0082813, entitled "METHOD AND SYSTEM FOR COORDINATE TRANSFORMATION TO MODEL RADIAL FLOW NEAR A SINGULARITY," published on Jun. 27, 2002 (the "Radial Transformation Application"), and incorporated herein in its entirety, can be used within the well bore mesh area and surrounding areas to provide a better model solution. In this way, the geometry of the well bore mesh honors the actual physical well geometry while providing a means to more accurately solve the physical system for the properties in the near well region. For example, permeability and porosity near the well bore are important properties that can be measured in the field and then used to model how the property varies with distance and space in the area near the well bore. The mesh inside the well bore provides the ability to get better resolution and, in combination with the improved accuracy provided by the radial transformation disclosed in the Radial Transformation Application, provides for much better solutions in the near well regions than can be provided by prior art methods and systems. It is important to note that once a well bore moves away from the vertical, flow around the well bore becomes less radial. Beyond the near well area, ordinary meshing and ordinary solving techniques can be used.

Additionally, sets of inputs for the near well region of the reservoir can be varying values of, for example, porosity, flow, and permeability. This near well property alteration ("NWPA") provides a means for predicting the behavior in the near well region as values of different properties change. Alterations to the values of properties near the well bore can be input into the models generated by the method and system of the present invention to predict changes in behavior. In this way, potential damage that can result as properties such as conductance (permeability) change can be predicted before it occurs. Also, engineers can more accurately determine how best to extend a well's life, or to increase production. Near well property alteration can thus be used within the well bore mesh to alter the value of properties at different nodes (solution points) to model how a property may vary with, for example, distance. NWPA is thus a mechanism for assigning values to physical parameters in and near the well bore mesh. Property values that can be used for inputs at the well bore nodes can be user obtained measurements or can be arbitrarily determined values. For example, direct and indirect measurements can be made of porosity conductance and flow. NWPA allows a user to specify the resolution for properties in and near the well bore. This provides a more accurate representation of the system being modeled.

Generally speaking, other embodiments of the present disclosure comprise a method for simulating systems using a finite element modeling, as well as computer applications which embody the method and computers which are configured to perform the method. The method involves the definition of multiple, distinct finite element models which represent corresponding regions within the modeled system. Each of these finite only models comprises a set of nodes at which values are defined for various properties. For nodes, which lie on boundaries between models, there are a plurality of values corresponding to a given property, wherein each of the values corresponds to a different one of the models. Each of the models is solved separately, using the values for each property, which correspond to that model.

As indicated above, the exemplary method may be useful in the simulation of oil reservoirs that have features that cause certain properties to vary rapidly as a function of position within the reservoir. These features may include distinct geological strata, fractures, completion zones, damage zones, or any other feature that may cause strong heterogeneities within the reservoir. It should be noted that, while the embodiments of the invention described herein are primarily directed to the modeling of geological structures such as oil reservoirs, they may also be applied to the modeling of other systems.

Figure 16:
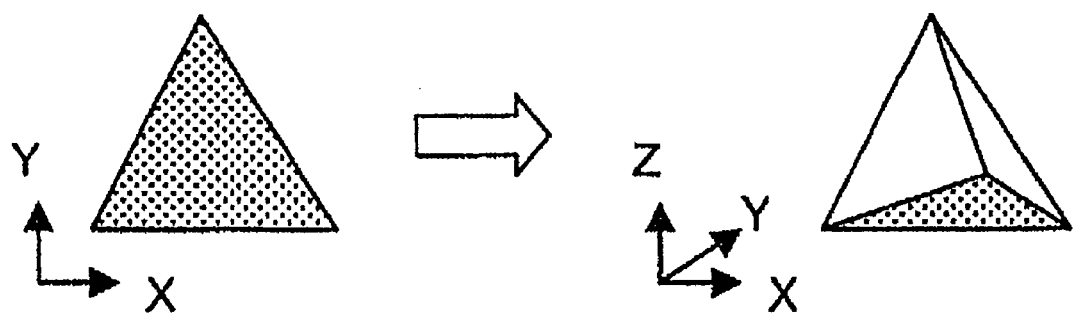
FIG. 16 is a diagram illustrating the simplices in two and three dimensions.

As described above, a simplex is a spatial configuration of n dimensions determined by n+1 points in a space of dimension equal to or greater than n. In other words, a-simplex is a geometric spatial element having the minimum number of boundary points to enclose a space in a given number of dimensions. For example, in two dimensions, a simplex comprises a triangle, together with the interior area bounded by the triangle (see FIG. 16.) Two points are insufficient to form a simplex in two-dimensional space because no area is bounded by the points (and the lines which interconnect them.) While four points may be sufficient to bound a two-dimensional area, they do not comprise the minimum number of boundary points by which the two-dimensional area can be bounded. In three dimensions, a simplex comprises a tetrahedron, which is bounded by four vertices (see FIG. 16.) In four dimensions, a simplex comprises a hypertetrahedron (sometimes referred to as a hypertet) having five vertices.

A mesh is a collection of elements that fill a space. These elements are representative of a system which resides in that space. Because each element can be defined by a plurality of nodes and/or the edges between those nodes, a mesh may alternatively be considered a collection of nodes and/or the edges between them. At various points in this disclosure, "mesh" will be used to alternately refer to collections of elements or nodes/edges, depending upon the context in which the term is used. The mesh may also be referred to herein as a finite element model or simply a model.

Figure 17:
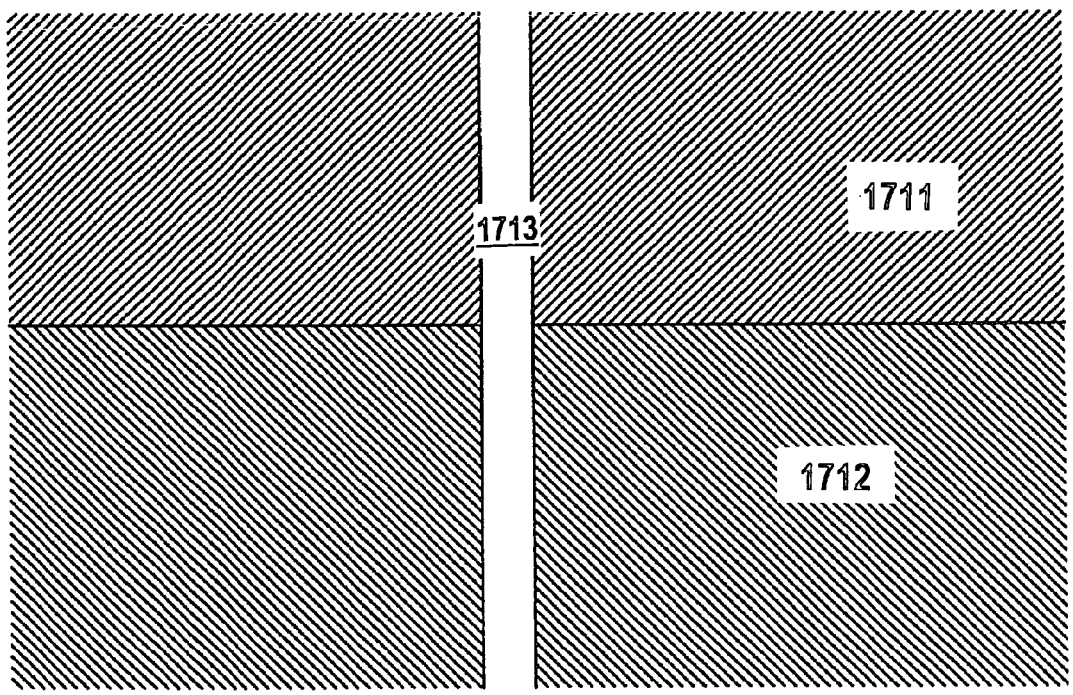
FIG. 17 is a diagram illustrating the boundaries between several features within a reservoir.

Referring to FIG. 17, a diagram illustrating the boundaries between several features within a reservoir are shown. The figure is a sectional view of an oil reservoir which is being modeled. FIG. 17 depicts a first layer 1711, which comprises a first material (e.g., shale), which has a corresponding set of properties. A second layer 1712 is also shown. Layer 1712 comprises a second material (e.g., chalk) which has a corresponding set of properties. Generally speaking, the same properties (e.g., permeability or porosity) will be identified for both layers for the purposes of modeling the reservoir. The values for these properties in each of the layers, however, may differ substantially. For example, the permeability of one layer might be high while the permeability of the other is low. FIG. 17 also depicts a fracture 1713 which extends through both layer 1711 and layer 1712. The fracture can also be characterized by corresponding values for each of the identified properties. For instance, although it is not normally used as an identifying characteristic of a fracture (i.e., empty space,) a permeability value (which will obviously be very high) can be assigned to the fracture.

When a finite element model for the reservoir depicted in FIG. 17 is constructed, it may comprise three sub-models: one corresponding to layer 1711; one corresponding to layer 1712; and one corresponding to fracture 1713. Each sub-model will include nodes which lie on the boundaries between it and the other sub-models. Generally speaking, each node which is on one of these boundaries will be common to all of the sub-models which share that boundary (although this is not always the case.) Because nodes which are common to more than one sub-model will need to have different values for particular properties, depending upon the sub-model which is being evaluated, a mechanism is be provided to ensure that the proper values are used.

In a particular embodiment, an evaluator is associated with each of the sub-models. The evaluator controls the values of the parameters for each of the nodes on the boundaries between models. In this way, it defines parameters for each node according to the sub-model which is being solved. As a solution for a particular sub-model is computed, the evaluator corresponding to the sub-model is applied to the common nodes so that the parameters corresponding to that sub-model are used for the common nodes. Thus, a single node which lies on a boundary between two sub-models is seen as having a first set of parameters from a first one of the sub-models, but is seen as having a second set of parameters from a second one of the sub-models.

In the present method, sub-models can be created for selected structures within a reservoir (e.g., geological strata, fractures, etc.) Using these sub-models, unique values or functions can be employed to simulate property variations within each structure. Because the sub-models are distinct, boundaries between elements with sharply contrasting properties can be accurately represented.

Figure 18:
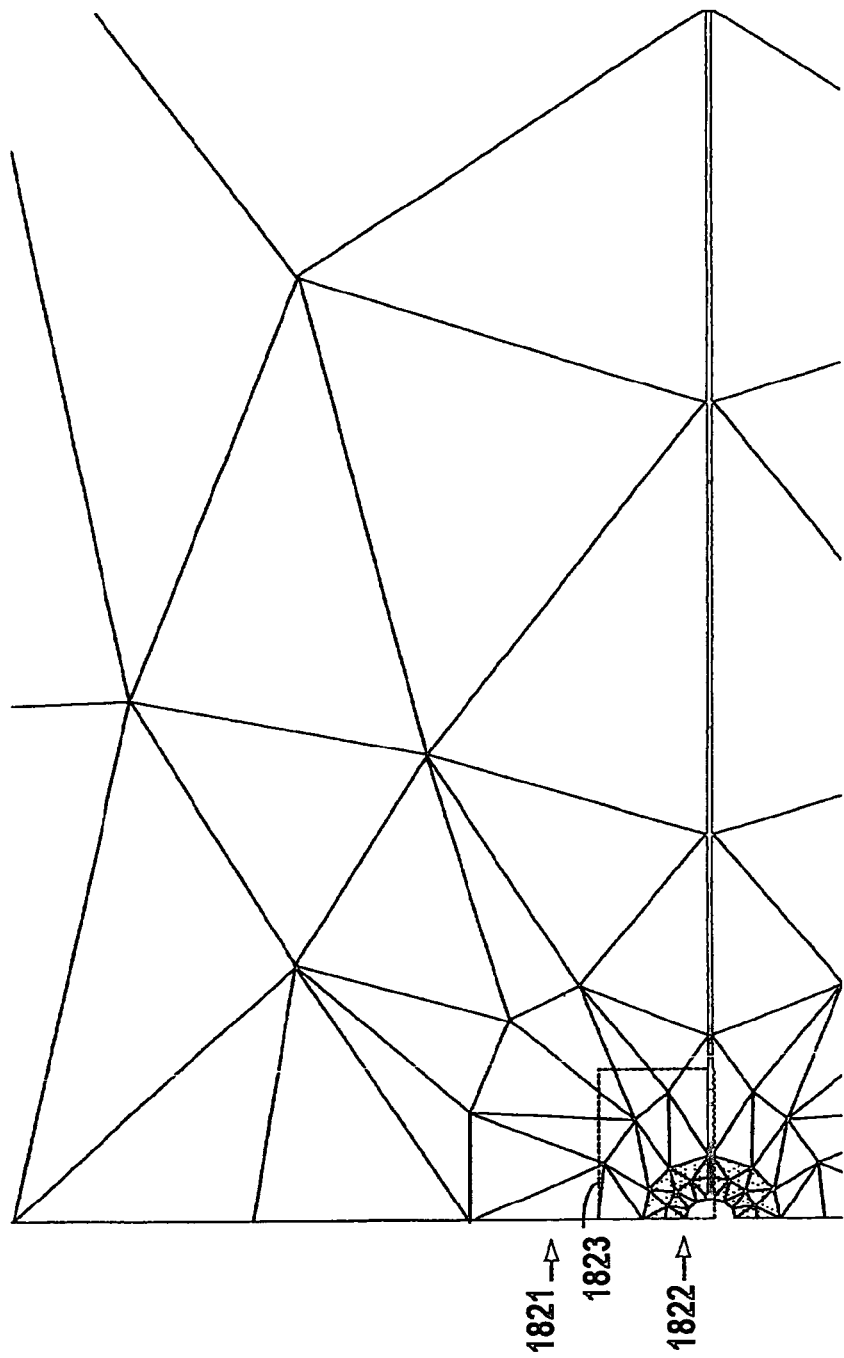
FIG. 18 is a diagram illustrating a two-dimensional finite element mesh corresponding to a portion of an oil reservoir.
Figure 19:
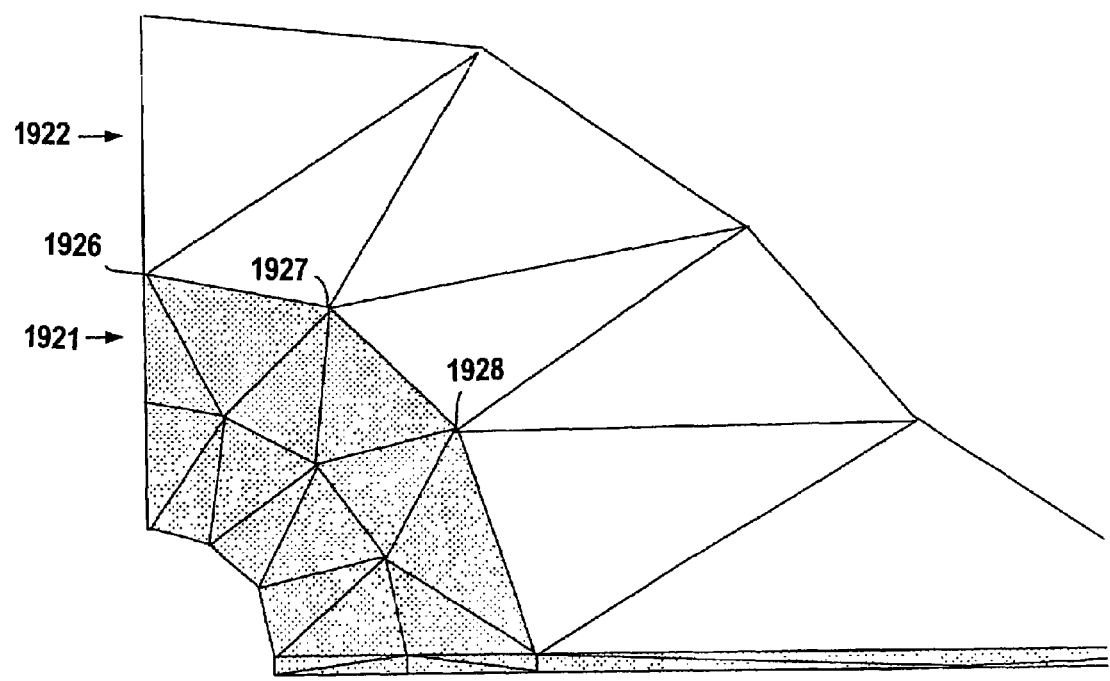
FIG. 19 is a an expanded view of the two-dimensional finite element mesh illustrated in FIG. 18.

Referring to FIGS. 18 and 19, a two-dimensional finite element mesh corresponding to a portion of an oil reservoir is shown to illustrate the use of distinctive sub-models to represent different regions within the reservoir. FIG. 18 is a larger view of the mesh, while FIG. 19 is a close-up view of the same mesh. The extent of the mesh shown in FIG. 19 is indicated by dotted line 1823 in FIG. 18.

The mesh shown in FIG. 18 comprises two sub-models representing distinct features within the reservoir. The first model 1821 corresponds to a partial completion area and a fracture. The second model corresponds to a separate, relatively homogeneous structure which adjoins the completion area and fracture. ("Homogeneous" is used here to refer to properties which change relatively slowly, rather than simply being constant.) Model 1821 is stippled to more clearly delineate its extent.

The elements of the mesh in FIGS. 18 and 19 are bounded by the lines which represent the edges of the elements. Each of the edges extends between two corresponding nodes of the mesh. The two-dimensional mesh can be extruded into a third dimension to form a three-dimensional finite element mesh, as will be explained in more detail below.

Because the elements of model 1822 represent a relatively homogeneous region, they can be stimulated with relative ease by a corresponding property value (or mathematical function.) The elements of model 1821 are also sufficiently homogeneous within the model that the properties of the nodes in the model can be modeled by assigned values or mathematical functions. Because they are modeled by separate values and/or functions, the properties of adjacent elements in the two models (one from each model) can have sharp changes or discontinuities at the boundary between the elements.

Referring to FIG. 19, it can be easily seen that some of the nodes which define elements of model 1921 are also used to define elements of model 1922. For example, nodes 1926, 1927 and 1928 lie on the boundary between the two models and are used to define elements of each of the models. Consequently, these nodes may have to take on different values for a given property, depending upon whether they are being evaluated with respect to one model or the other. This is achieved in the particular embodiment by associating a unique evaluator with each of the models. When a solution is generated for a particular model, the evaluator associated with that model is used to determine the appropriate value for each of the boundary nodes.

It should be noted that there may be nodes which lie on the boundary between two models, but which are not common to both models. Because these nodes define elements in only one of the models, they have only one value/function for each property, so there is no need to identify the model for which the node is being used to compute a solution.

Figure 20:
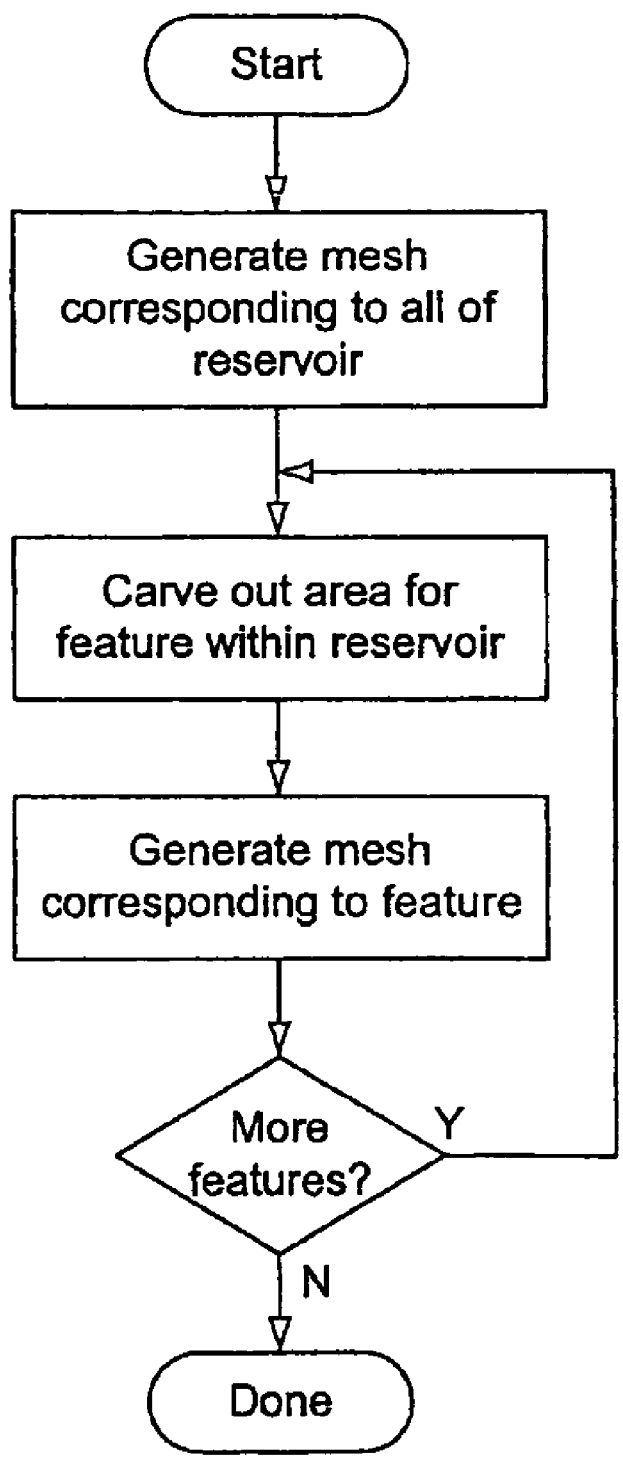
FIG. 20 is a flow diagram illustrating a method according to one embodiment of the invention.

Referring to FIG. 20, a flow diagram illustrating a method according to one embodiment of the invention is shown. While this figure will be described with reference to an oil reservoir as the modeled system, the same methodology can be applied to other systems as well. In this method, an initial finite element mesh corresponding to the overall reservoir is generated and then separate finite element meshes corresponding to features within the reservoir are inserted into the first mesh. This first mesh is adapted to accommodate the new, secondary meshes. In other words, the regions occupied by the secondary meshes are carved out of the first mesh so that no two meshes occupy the same space.

The initial finite element mesh, as adapted to accommodate the other meshes, will serve as a model for one of the regions of the reservoir. (Although this region may be smaller than the other regions in some cases, it will typically represent the bulk of the reservoir.) This mesh can be generated by any suitable means known to persons of skill in the art of finite element modeling. An unstructured mesh of simplex elements is desirable. After the first mesh is generated, a feature is defined and then a secondary region is carved out of the first mesh to accommodate the secondary region. A mesh is generated within the boundaries defined for the feature. The mesh may be constructed before the secondary region is carved out of the first mesh, or it may be generated afterwards. In either case, two separate finite element models corresponding to the different regions of the modeled system are created. These models are immediately adjacent to each other (i.e., there is a common boundary between them.) This process may be repeated for additional features in the modeled system (and additional secondary regions within the first finite element mesh).

In a particular embodiment, this process is actually carried out in two dimensions to generate a mesh which is then extruded into three dimensions. For example, if it is assumed that the completion zone and fracture represented by model 1921 in FIG. 19 represent features in a horizontal plane, the two-dimensional mesh shown in the figure can be extruded vertically to generate a three-dimensional mesh. This is illustrated in FIG. 21.

Figure 21:
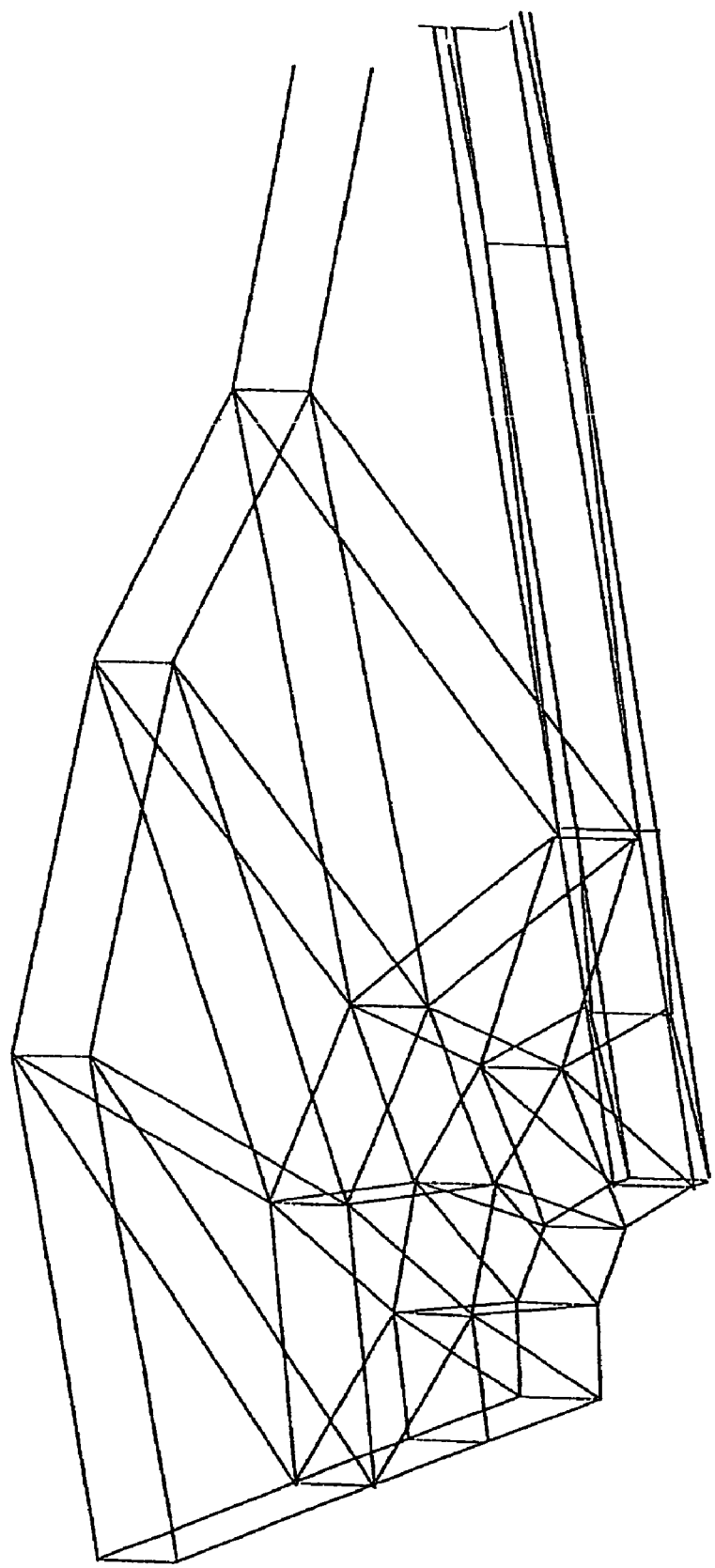
FIG. 21 is a diagram illustrating a three-dimensional finite element mesh generated by extruding the two-dimensional mesh of FIG. 19.

FIG. 21 shows the two-dimensional mesh of FIG. 19 from an oblique angle. This two-dimensional mesh is extruded vertically (as indicated by the dotted lines) to form a plurality of three-dimensional prisms. In a particular embodiment, these prisms are subdivided into three-dimensional simplices (tetrahedra.) The generation of a three-dimensional mesh in this manner may reduce the computational requirements of mesh generation by confining the adaptation process (the dividing of the initial mesh into two separate meshes) to two dimensions and then extruding the refined two-dimensional mesh. This eliminates what is effectively the separate refinement of the same two-dimensional mesh several times at different points in the third dimension.

Figure 22:
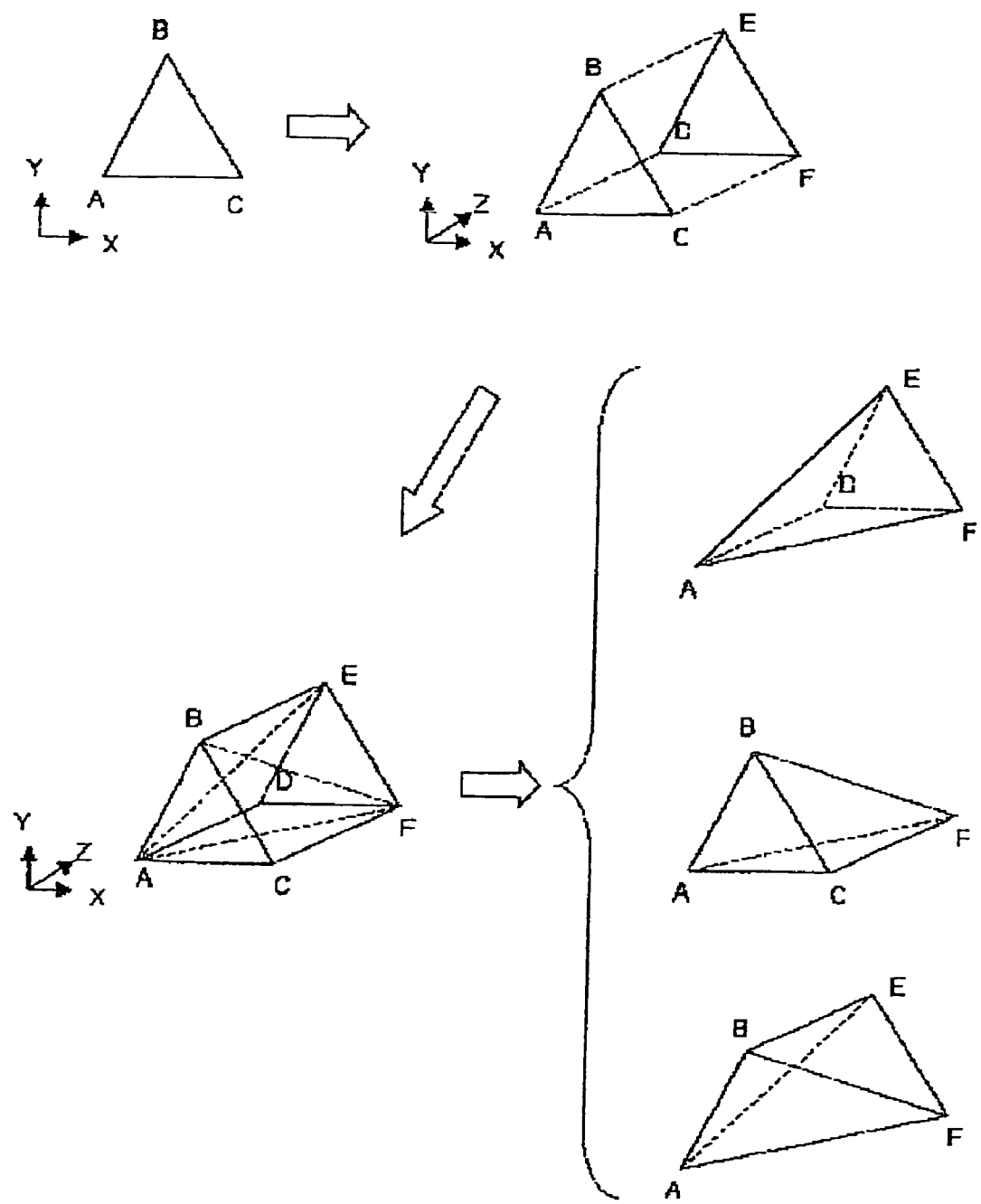
FIG. 22 is a diagram illustrating the manner in which a two-dimensional mesh is extruded to form a three-dimensional mesh.

While the extrusion process will not be described in detail in this disclosure, FIG. 22 is presented herein to illustrate the manner in which the extrusion from two dimensions to three dimensions is accomplished. FIG. 22 shows a single, two-dimensional simplex (a triangle) which is extruded to form a three-dimensional prism. This prism is then subdivided into three three-dimensional simplices (tetrahedra). It should be noted that this same procedure can be used to extrude a three-dimensional mesh in a fourth dimension (e.g., time.)

In one embodiment, the boundaries of the different regions are determined before any of the meshes are generated. When the different regions are defined, a mesh is constructed within each region. Each mesh is constructed so that it extends to the boundaries which are shared by the meshes (as well as the outer extent of the entire modeled system.) The generation of the mesh may be performed in any suitable manner. Any desired number of regions can be defined and corresponding meshes can be generated within these regions.

In another embodiment, the first mesh is generated so that it fills the entire space of the modeled system. A boundary is then defined to separate the regions of the system. Since this boundary may cut existing elements into two pieces, the mesh in each region is adapted to form valid simplices in place of the intersected elements. This results in two meshes corresponding to the two regions of the system.

Although the adaptation process will not be described in great detail, FIG. 23 is presented to provide an illustration of the process. FIG. 23 comprises three views of a two-dimensional simplex (a triangle) which is adapted to form simplices on each side of a boundary. In the first figure, the simplex is shown intersected by a boundary curve. The edges of the simplex are intersected at two points. A new node is created at each of the intersections. A new edge is then defined between one of the new nodes and the opposite vertex of the simplex, forming two new simplices. A new edge is then defined between the remaining new node and the opposite vertex of the new simplex. This procedure results in three new simplices—one above the boundary, and two below it.

Essentially the same procedure can be performed in the case of three-dimensional simplices. The resulting simplices will lie essentially on one side or the other of the boundary. (Because the boundary may be curved, the simplices, which have flat surfaces, may not lie exactly on the boundary.) Since the adaptation process produces simplices which are almost entirely on one side of the boundary, they can each be defined as part of the first region or the second region, hence part of the first finite element model or the second.

It should be noted that the preceding paragraphs describing the creation of finite element models corresponding to different regions of the modeled system are applicable to n-dimensional meshes.

Broadly speaking, the invention comprises methods for solving finite element models, wherein the solution is likely to be both monotonic and to satisfy linearity preservation. This ensures that the solution will be both accurate and realistic. The monotonicity and the linearity of the solution are ensured by generating a matrix for the solution of the finite element model such that the elements of the matrix which are on the diagonal are non-negative, and the elements which are off-diagonal are non-positive. This matrix can then be solved using conventional finite element techniques to generate the desired accurate, realistic solution.

Particular embodiments of the present methods provide a number of advantages over traditional finite element and finite difference techniques. As indicated above, embodiments of the present methods provide the accuracy of traditional finite element techniques without the disadvantages of unrealistic, oscillating solutions. Similarly, the embodiments of present methods provide the stability of traditional finite difference techniques while providing much greater accuracy.

The accuracy and realism provided by the present methods lead to additional advantages in the utilization of computer resources. For example, the present methods may allow for faster generation of solutions for physical systems. This is a result of several things. First, because the solution is physically realistic, it does not oscillate, and consequently tends to converge more rapidly. Further, because generation of the solution using the present methods typically requires less iterations and is faster than traditional finite element techniques, less CPU time is required to generate the solution. The present methods may also use less memory than traditional techniques. Because the present methods are generally more accurate than traditional finite difference techniques, is not desirable to use as many nodes to model the physical system. Consequently, less memory is required to store the model (and less CPU time is required to compute a solution based on these nodes.) the present methods may also be more reliable than traditional techniques. The oscillation of solutions generated using traditional finite element techniques may, in some instances, prevent a solution from converging at all. As noted above, the present methods provide solutions which are realistic (e.g., they do not oscillate between realistic solutions and solutions which are not possible,) so the solutions will reliably converge.

In finite element modeling, the region that is to be analyzed is broken up into sub-regions called elements. This process of dividing the region into sub-regions may be referred to as discretization or mesh generation. The region is represented by functions defined over each element. This generates a number of local functions that are much simpler than those which would be required to represent the entire region. The next step is to analyze the response for each element. This is accomplished by building a matrix that defines the properties of the various elements within the region and a vector that defines the residuals acting on each element in the domain. Once all the element matrices and vectors have been created, they are combined into a matrix equation. After applying boundary conditions, the matrix equation can be solved to obtain unknown nodal responses. Intra-element responses can be interpolated from nodal values using the functions which were defined over each element.

The following description of one embodiment of the present method relates to the modeling of oil reservoirs. This embodiment is intended to be exemplary, and it should be noted that the present methods may be applied to a variety of physical systems, such as flow over aircraft, weather prediction, flow through internal combustion engines, and other industrial fluid flows. This list of potential applications of the present methods is intended to be illustrative rather than limiting.

There is a fundamental difference between modeling systems in which there is a single fluid phase and those in which there are multiple phases. When there are multiple fluid phases, there is a convection and potentially a mixing of the phases. (It is assumed that there is a pressure which drives the fluids and causes the front between them to be transported.) The finite element model therefore includes convective operators or components. These operators would not be desirable if only one fluid phase were modeled, or if the multiple fluid phases were completely mixed or emulsified.

Figure 24:
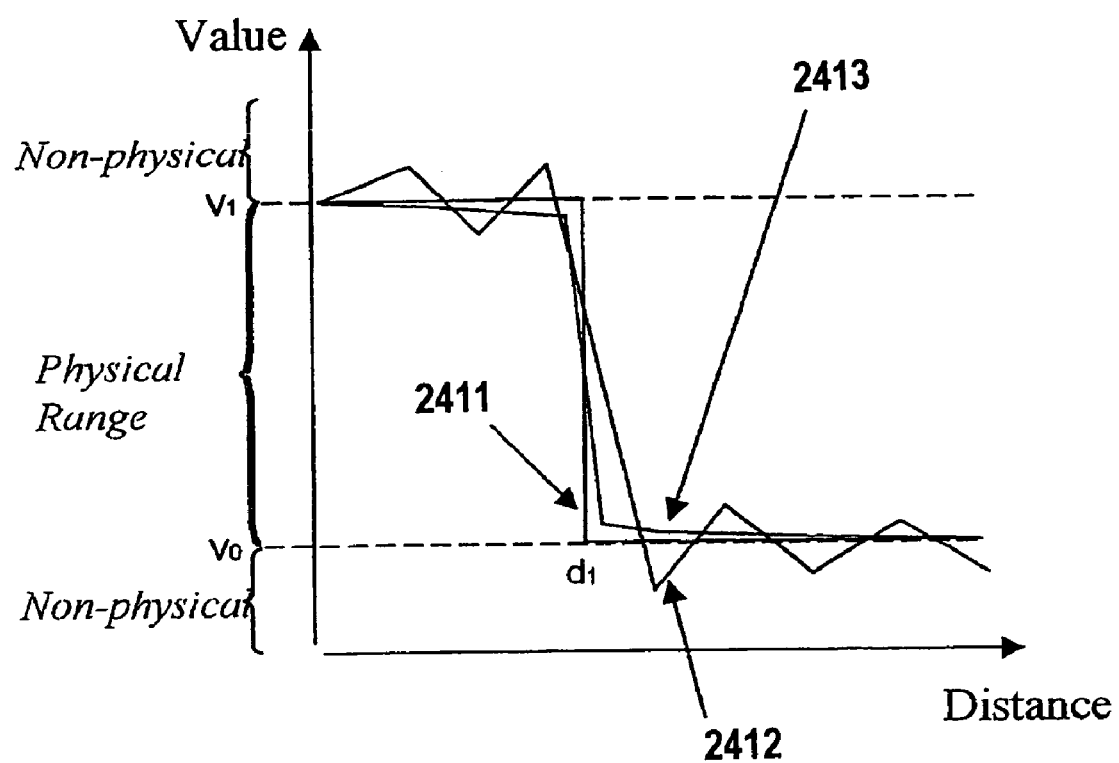
FIG. 24 is a diagram illustrating the difference between the actual values in the physical system and the solutions generated using traditional finite element techniques and techniques according to the present invention.

In a system having multiple fluid phases, characteristics of the system may change very abruptly. This situation is illustrated in FIG. 24. FIG. 24 is a diagram illustrating the difference between the actual values in the physical system and the solutions generated using traditional finite element techniques and techniques according to the present invention. It can be seen that the actual ("real world") values 2411 form what is essentially a step function, changing from a first value v1 to a second value v0 immediately upon reaching a distance d1. In this example, the values v0 and v1 define the limits of the range of physically realizable values.

When traditional finite element techniques are used to model such a system, the solution will typically tend to oscillate. It can be seen in FIG. 24 that the solution 2412 generated using these techniques oscillates above and below the actual physical values which it is attempting to model. Two of the most significant problems with this solution are the obvious inaccuracy (the solution does not closely track the actual values) and the fact that, at some points, the solution is greater than the maximum physically realizable value or less than the minimum physically realizable value. The oscillations which occur in solutions generated using traditional finite element techniques may therefore produce unrealistic results, or may even fail to converge at all.

Methods in accordance with this disclosure, however, do not suffer from these disadvantages because the solutions are constrained to be realistic. This constraint is achieved by ensuring that the matrix which governs the solution vector (i.e., the Jacobian matrix) satisfies the properties of monotonicity and preservation of linearity. In more practical terms, this consists of ensuring that all of the coefficients on the diagonal of the matrix are non-negative and that all of the coefficients off the diagonal of the matrix are non-positive. When the matrix has these characteristics, the solution remains realistic at all points, and more accurately tracks the behavior of the physical system, as indicated by curve 2413 in FIG. 24. The model is therefore more likely to produce accurate results and to reliably converge.

The Jacobian matrix is derived from the partial differential equations that describe multiphase flow through porous media based on Darcy's law, and representing conservation of mass and momentum in the system. These equations are discretized onto the finite element mesh, and the coefficients of the equations form a matrix. Each coefficient will be either positive or negative, depending upon whether the gradient of the equation is positive or negative (i.e., whether the fluid flow is positive or negative). If the finite element technique is applied to the differential equations, a large set of algebraic equations is produced. That set of algebraic equations is nonlinear. The set of equations can be solved by using Newton's method (which involves taking the first derivative of the equations). The first derivative is the Jacobian matrix. The coefficients of this matrix are weighted to obtain a matrix which has non-negative terms on its diagonal and non-positive terms off the diagonal. The appropriate weighting of the terms ensures the monotonic and linear properties of the matrix.

The coefficients of the Jacobian matrix are essentially weighting factors for each of the nodes of the elements in the finite element mesh. In traditional finite element techniques, the nodes of an element are evenly weighted. For example, in a two-dimensional element, each of the three nodes would be weighted by ⅓. If a three-dimensional element were used, each of the four nodes of the element would be weighted by ¼. In the present methods, however, the nodes are weighted to reflect the flow of the fluids in the modeled system. This is illustrated with reference to FIGS. 25-28.

Figure 25:
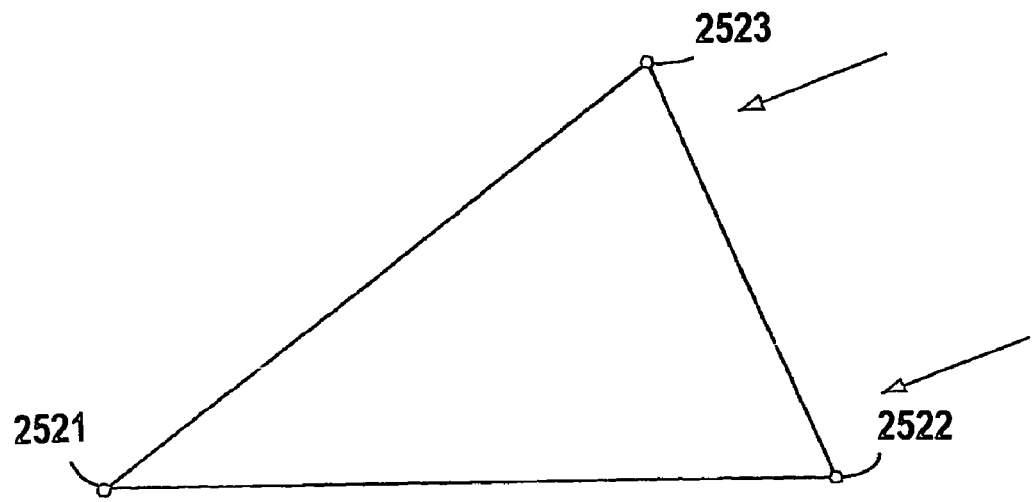
FIG. 25 is a diagram illustrating the flow of fluid across a first two-dimensional simplex element.
Figure 26:
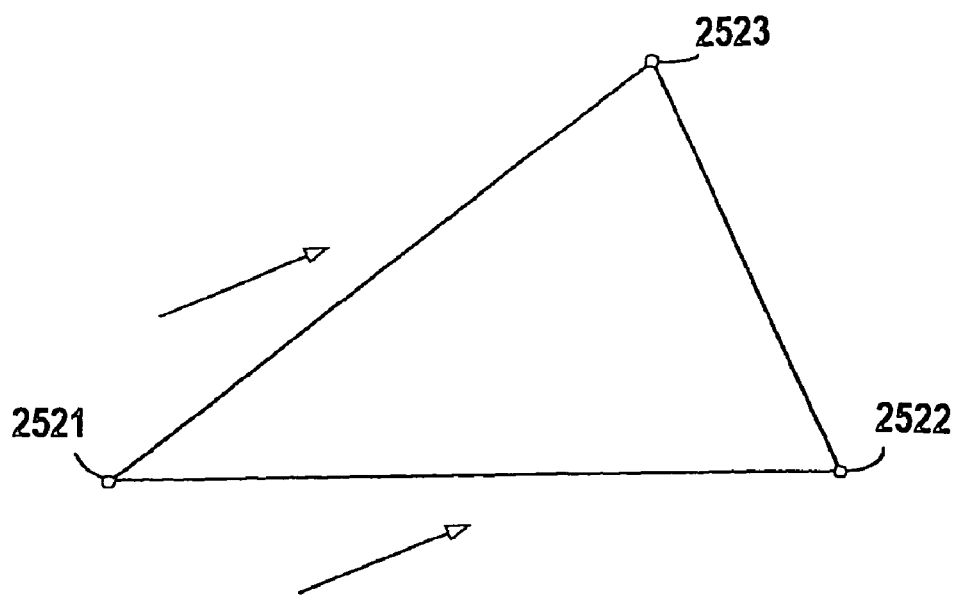
FIG. 26 is a diagram illustrating the flow of fluid across the first two-dimensional simplex element in a direction opposite the flow illustrated in FIG. 25.

FIG. 25 shows a single, two-dimensional element (a triangle). The flow of fluid with respect to the element is indicated by the arrows, which show that the fluid is flowing from the upper, right-hand portion of the figure to the lower, left-hand portion of the figure. Using traditional finite element techniques, each of nodes 2521-2523 would be evenly weighted (i.e., ⅓, ⅓, ⅓). Using the present techniques, the nodes are not evenly weighted. Because the fluid is flowing generally from nodes 2522 and 2523 to node 2521, each of nodes 2522 and 2523 is weighted by ½, while node 21 is weighted by 0. Referring to FIG. 26, it can be seen that the weighting of the nodes is different when the direction of the fluid flow changes. In FIG. 26, the fluid flow is generally from the lower, left-hand portion of figure to the upper, right-hand portion of the figure. Consequently, node 2521 is weighted by 1, while nodes 2522 and 2523 are weighted by 0.

Figure 27:
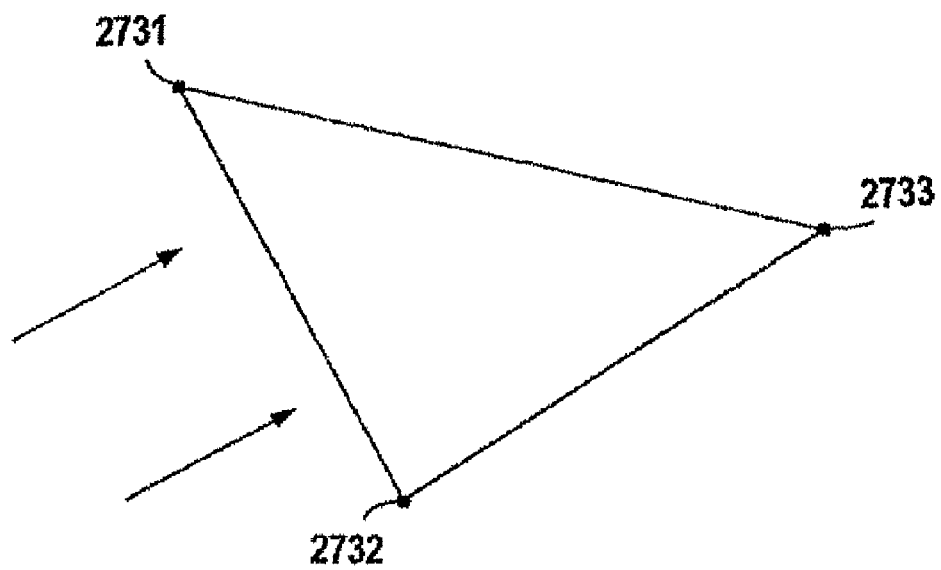
FIG. 27 is a diagram illustrating the flow of fluid across a second two-dimensional simplex element.
Figure 28:
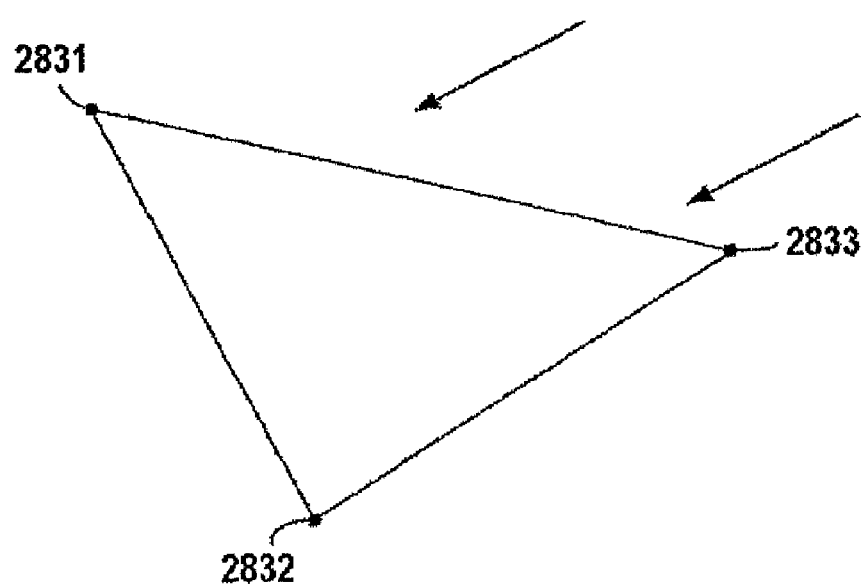
FIG. 28 is a diagram illustrating the flow of fluid across the second two-dimensional simplex element in a direction opposite the flow illustrated in FIG. 27.

Referring to FIGS. 27 and 28, it can be seen that the weighting of the nodes is also affected by the shape of the corresponding element. In FIG. 27, the flow of fluid is approximately perpendicular to an edge of the element. This situation is similar to that of FIG. 25, in which each of the nodes which terminates the forward edge of the element was weighted by ½. In that case, the remaining node of the element was downstream from a midway point on the forward edge of the element. In FIG. 27, the remaining node is instead directly downstream from one of the first to nodes. In this situation, the node 2732, which is upstream from the last node 2733, is weighted by ⅔, while the other upstream node 2731 is weighted by ⅓. In FIG. 28, there is a single upstream node 2833. Nodes 2831 and 2832 are both on the trailing edge of the element, so they are both weighted by 0. The upstream node 2833, the other hand, is weighted by 1.

In each of these cases, the weighting of the nodes with respect to the direction of fluid flow effectively emphasizes the diagonal elements of the matrix, while reducing or eliminating the effect of the off-diagonal elements. This, in turn, ensures that the matrix has the properties of monotonicity and linearity.

Although the foregoing is sufficient to enable a person of ordinary skill in the field of finite element analysis to implement the present techniques, a brief technical discussion of the techniques follows.

Figure 29:
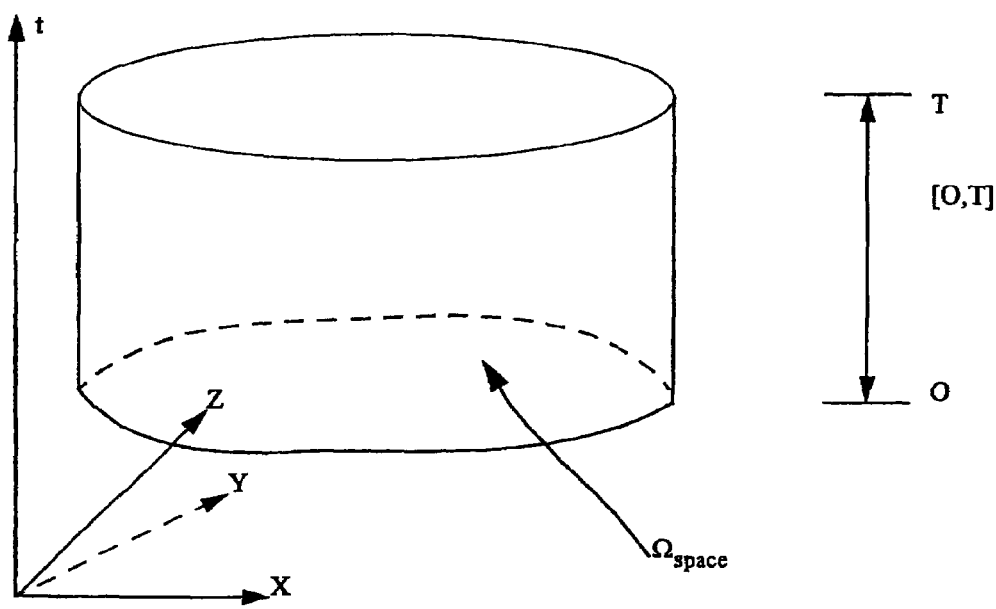
FIG. 29 is a diagram illustrating a two-dimensional projection of a time-space domain.

Considering a physical system which is to be modeled over time, a finite element mesh is first constructed (i.e., the system is discretized in the space-time domain). Referring to FIG. 29, a two-dimensional projection of the time-space domain is illustrated.

$\Omega = \Omega_{space} \times [O,T]$ is the space-time domain to be modeled, where $\Omega_{space} \epsilon R^3$.

$\Omega$ is broken down (segmented) into a plurality of non-overlapping sub-domains $\Omega_e$. Each of these sub-domains $\Omega_e$ and $1e\ e\_=\_e\{1,,NE\}$ comprises a four-dimensional simplex (a hypertetrahedron). A linear finite element basis is formed on each element ($\Omega_e$), and trial functions and test functions are defined on each element.

The flow of multi-phase fluids in porous media is governed by the equation:$2 t (S_iB_i)+(V_{ii})=0$ Where:
i=1, 2, . . . , nphases
$V_i = -K(\nabla P_i + \rho_{ig} \nabla Z)$
$P_1 = P$
$P_i = P - P_{c,i}$, i=2, . . . , nphases
$\lambda_i = 3K_{riii}$
$\mu_i$ =Viscosity of i'th phase
$B_i$ =Formation Volume Factor of i'th phase
$\rho_i$ =Density of i'th phase
$\phi$ =Rock Porosity
Z=Negative of Depth
$S_i$ =Saturation of i'th phase 4 inphaseSi=1

Figure 30:
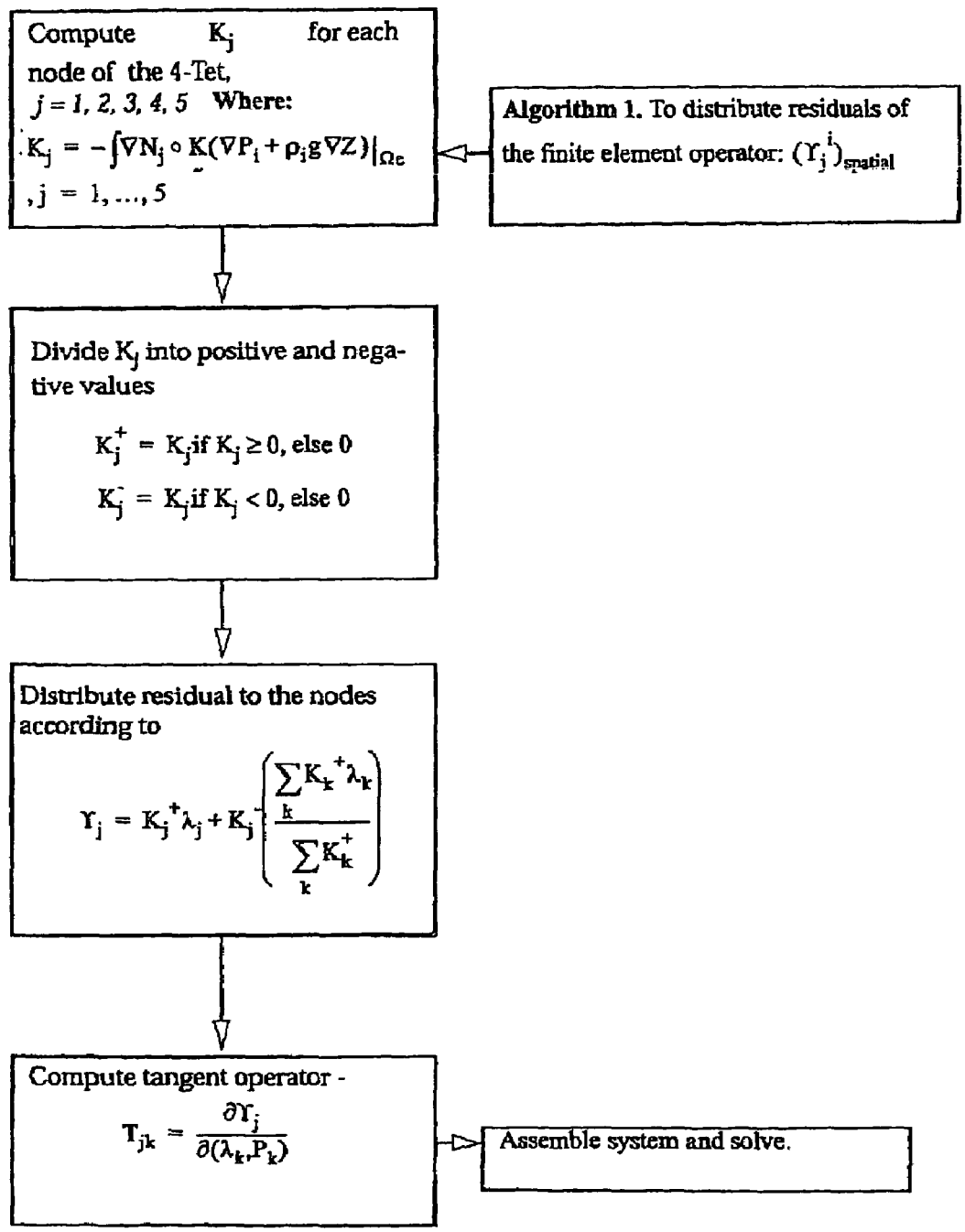
FIG. 30 is a flow diagram illustrating a method in accordance with one embodiment of the present invention.

A standard Galerkin Finite Element discretization of $5(\sim ji)=eNjt((SiBi)\ kNk)+[-eNjK\sim(Pi+igZ)|e(i)|e\_]$ this multi-phase flow equation gives, for each element: $6\sim ji=(eNjtNk+|e\ NjtNkl)(SiBi)k+(ji)spatial$ The basic method of employing the present techniques is defined by the way that {overscore ($\lambda_i$)} is defined. The present method is therefore defined as follows:

Referring to FIG. 30, a flow diagram illustrating a method in accordance with one embodimnent of the present invention is shown. As indicated above, when the differential equations are discretized on the finite elements, they are basically converted from differential equations to algebraic relationships between the values of the nodes. This is accomplished by assuming that there is a linear variation of the corresponding property (e.g. saturation, pressure, permeability, prostate, etc.) between the nodes. This restricts the space of all possible solutions to only those solutions which are linear. When this assumption is used, a set of relations are derived from the differential equations for values of the coefficients which are linear over each element. When this is done, each element contributes a certain amount of the discretization to each one of its nodes. The contributions which are summed at each node are the residuals. It is desired to make the residuals equal 0 in order to solve the nonlinear algebraic system.

To distribute the residuals of the finite element operator ($\Upsilon_j^i$), $K_j$ is first computed for each node of the 4-tet (hypertetrahedron). The resulting $K_j$ are divided into positive ($K_j^+$) and negative ($K_j^-$) values. The residual $\Upsilon_j$ is then distributed to the nodes, and the tangent operator ($T_{jk}$) is computed. The system is then assembled and solved in the same manner as if an ordinary finite element technique had been used. (Since the process by which finite element systems are assembled and solved is well known, it will not be described in further detail here).

In a particular embodiment, the disclosure is directed to a computer-implemented method of representing fluid flow in a physical fluid reservoir. The method includes generating a mesh representation of the physical fluid reservoir having a plurality of mesh elements. Each of the plurality of mesh elements is representative of a regional portion of the fluid reservoir. The method further includes generating a matrix-based representation of fluid flow comprising matrix elements associated with a mesh element and selectively weighting the matrix elements based on fluid flow direction in the regional portion of the fluid reservoir represented by the mesh element associated with the matrix element.

In another exemplary embodiment, the disclosure is directed to a computer readable media including computer implement instructions operable by a processor to perform a method of forming a representation of a physical system including a fluid reservoir having multi-phase fluid flow therein. The method includes generating an initial matrix including a plurality of coefficients. A first set of the plurality of coefficients are included in on-diagonal elements of the matrix and a second set of the plurality of coefficients are included in off-diagonal elements of the matrix. Each of the plurality of coefficients corresponds to and represents a portion of the fluid reservoir and are associated with fluid flow therein. The method further includes adjusting the coefficients of the initial mesh to limit the matrix elements to physically realizable values and to track the behavior of the physical system including the fluid reservoir by adjusting each of the plurality of coefficients to weight nodes of each of the elements according to a direction of fluid flow across each of the elements such that each of the on-diagonal elements are non-negative and each of the off-diagonal elements are non-positive and generating the representation of the physical system including the fluid reservoir. The representation of the physical system is constructed from the adjusted coefficients.

In a further exemplary embodiment, the disclosure is directed to a computer readable media including computer implement instructions operable by a processor to perform a method of representing a fluid reservoir. The method includes generating a first mesh representation of the fluid reservoir having a first physical property representation, generating a second mesh representation of a feature of the fluid reservoir having a second physical property representation, inserting the second mesh representation of the feature into a carved out portion of the first mesh representation to form a combined mesh representation including a plurality of boundary nodes associated with both the first mesh representation and the second mesh representation, and selectively applying the first physical property representation or the second physical property representation to the boundary nodes.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. Many variations, modifications, additions and improvements to the embodiments described above are possible. In particular, these variations may include computer readable media (such as floppy disks, CD-ROMs, DVD-ROMs, etc.,) storage devices, computer memories and the like which contain software, firmware or other programming embodying the foregoing methods. It is contemplated that all such changes and additional embodiments are within the spirit and true scope of this invention as claimed below.

What is claimed is:

1. A computer-implemented method of representing fluid flow in a physical fluid reservoir, the method comprising:
   generating a mesh representation of the physical fluid reservoir having a plurality of mesh elements, each of the plurality of mesh elements representative of a regional portion of the fluid reservoir;
   generating a matrix-based representation of fluid flow comprising matrix elements associated with a mesh element;
   selectively weighting the matrix elements based on fluid flow direction in the regional portion of the fluid reservoir represented by the mesh element associated with the matrix element; and
   storing a record including data related to at least one of the matrix elements and the mesh elements.

2. The method of claim 1, further comprising generating a fluid flow representation of the physical fluid reservoir based on the selectively weighted matrix elements.

3. The method of claim 2, further comprising manipulating production parameters of physical fluid reservoir based on the fluid flow representation.

4. The method of claim 1, wherein the physical fluid reservoir is a hydrocarbon reservoir.

5. The method of claim 1, wherein the matrix-based representation comprises a four-dimensional finite element representation.

6. The method of claim 1, wherein the matrix-based representation of fluid flow corresponds to a system in which there are at least two fluid phases.

7. The method of claim 1, wherein the matrix-based representation of fluid flow corresponds to a system in which there are three or more fluid phases.

8. A computer readable storage medium comprising computer executable instructions which, when executed by a computer, perform a method of forming a representation of a physical system including a fluid reservoir having multiphase fluid flow therein, the method comprising:
   generating an initial matrix including a plurality of coefficients, a first set of the plurality of coefficients comprising on-diagonal elements of the matrix and a second set of the plurality of coefficients comprising off-diagonal elements of the matrix, each of the plurality of coefficients corresponding to and representing a portion of the fluid reservoir and associated with fluid flow therein;
   adjusting the coefficients of the initial mesh to limit the matrix elements to physically realizable values and to track the behavior of the physical system including the fluid reservoir, by adjusting each of the plurality of coefficients to weight nodes of each of the elements according to a direction of fluid flow across each of the elements such that each of the on-diagonal elements are non-negative and each of the off-diagonal elements are non-positive;
   generating the representation of the physical system including the fluid reservoir, wherein the representation of the physical system is constructed from the adjusted coefficients; and
   storing a record including data related to the adjusted coefficients.

9. The computer readable media of claim 8, wherein the representation of the physical system comprises a four-dimensional finite element mesh.

10. The computer readable media of claim 8, wherein the matrix corresponds to a system in which there are at least two fluid phases.

11. The computer readable media of claim 8, wherein the matrix corresponds to a system in which there are three or more fluid phases.

12. The computer readable media of claim 8, wherein the matrix corresponds to a four-dimensional finite element model.

13. A computer readable storage medium comprising computer executable instructions which, when executed by a computer, perform a method of representing a fluid reservoir, the method comprising:
   generating a first mesh representation of the fluid reservoir having a first physical property representation;
   generating a second mesh representation of a feature of the fluid reservoir having a second physical property representation;

inserting the second mesh representation of the feature into a carved out portion of the first mesh representation to form a combined mesh representation including a plurality of boundary nodes associated with both the first mesh representation and the second mesh representation;

selectively applying the first physical property representation or the second physical property representation to the boundary nodes; and storing a record including data related to at least one of the first mesh representation, the second mesh representation, the first physical property representation and the second physical property representation.

14. The computer readable media of claim 13, wherein the fluid reservoir is a hydrocarbon reservoir.

15. The computer readable media of claim 13, wherein the first physical property representation and the second physical property representation have distinct values at at least one of the plurality of boundary nodes.

16. The computer readable media of claim 13, wherein the first physical property representation and the second physical property representation are discontinuous at the at least one of the plurality of boundary nodes.

17. The computer readable media of claim 13, wherein the feature is selected from the group consisting of a fracture, a completion zone, a damage zone, a geological stratum, and a near well region.

18. The computer readable media of claim 13, wherein the method further comprises defining a boundary surface wherein generating the first mesh representation comprises defining nodes of the first mesh representation that lie substantially on the boundary surface, and wherein generating the second mesh representation comprises utilizing the nodes that lie substantially on the boundary surface, the first mesh representation comprising a first set of mesh elements located on a first side of the boundary surface and the second mesh representation comprising a second set of mesh elements located on a second side of the boundary surface.

19. The computer readable media of claim 13, wherein selectively applying the first physical property representation or the second physical property representation comprises associating an evaluator with each of the first mesh representation and the second mesh representation.

20. The computer readable media of claim 13, wherein the method further comprises generating a solution of the combined mesh representation.

* * * * *